US012786308B2

(12) United States Patent
Yu et al.

(10) Patent No.: US 12,786,308 B2
(45) Date of Patent: Nov. 3, 2026

(54) ELECTRONIC DEVICE AND METHOD FOR OPERATING IN FLEX MODE

(71) Applicant: SAMSUNG ELECTRONICS CO., LTD., Suwon-si (KR)

(72) Inventors: Hyemi Yu, Suwon-si (KR); Won Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 365 days.

(21) Appl. No.: 18/308,096

(22) Filed: Apr. 27, 2023

(65) Prior Publication Data

US 2023/0262158 A1 Aug. 17, 2023

Related U.S. Application Data

(63) Continuation of application No. PCT/KR2021/016163, filed on Nov. 8, 2021.

(30) Foreign Application Priority Data

Nov. 6, 2020 (KR) ........................ 10-2020-0147507

(51) Int. Cl.
*H04M 1/72454* (2021.01)
*H04M 1/02* (2006.01)
*H04M 1/72469* (2021.01)

(52) U.S. Cl.
CPC ..... *H04M 1/72454* (2021.01); *H04M 1/0268* (2013.01); *H04M 1/72469* (2021.01); *H04M 2201/38* (2013.01); *H04M 2201/42* (2013.01)

(58) Field of Classification Search
CPC ........... H04M 1/72454; H04M 1/0268; H04M 1/72469; H04M 2201/38; H04M 2201/42;
(Continued)

(56) References Cited

U.S. PATENT DOCUMENTS 7,676,763 B2 * 3/2010 Rummel ............... G06F 3/0482 715/845
10,291,674 B1 * 5/2019 Pierson ............ H04N 21/41415
(Continued)

FOREIGN PATENT DOCUMENTS

CN 110955373 A 4/2020
CN 111124561 A 5/2020
(Continued)

OTHER PUBLICATIONS

International Search Report for PCT/KR2021/016163 mailed Feb. 17, 2022, 3 pages.
(Continued)

*Primary Examiner* — Matthew A Eason
(74) *Attorney, Agent, or Firm* — NIXON & VANDERHYE P.C.

(57) ABSTRACT

An electronic device may include a display, a bending detector configured to detect bending of the display, a processor electrically connected to the display and the bending detector, and a memory electrically connected, directly or indirectly, to the processor. The processor may be configured to divide the display into a first area and a second area when entering to a flex mode in response to detecting the bending of the display while an application is executed, output a content element of the application to the first area of the display, and output, to the second area of the display, a control element corresponding to one or more items of a level lower than a first level included by a menu item of the first level that is mapped to the flex mode in the application.

15 Claims, 28 Drawing Sheets

(58) Field of Classification Search
CPC .. H04M 1/0245; G06F 1/1626; G06F 3/0487; G06F 2203/04803; G06F 1/1652; G06F 3/0482; G06F 1/1616; G06F 3/0484
See application file for complete search history.

(56) References Cited

U.S. PATENT DOCUMENTS

| | | | | |
|---|---|---|---|---|
| 2007/0101286 | A1* | 5/2007 | Minami | G06F 3/04817 715/779 |
| 2012/0060088 | A1* | 3/2012 | Hill | G06F 3/04817 715/702 |
| 2013/0037816 | A1 | 2/2013 | Tomiyasu et al. | |
| 2015/0378521 | A1* | 12/2015 | Wang | G06F 9/451 715/841 |
| 2016/0085319 | A1* | 3/2016 | Kim | H04M 1/0268 345/156 |
| 2016/0139685 | A1* | 5/2016 | Yang | G06F 3/1446 345/173 |
| 2016/0259514 | A1* | 9/2016 | Sang | G06F 3/04886 |
| 2016/0306508 | A1* | 10/2016 | Voisin | G06F 3/0482 |
| 2016/0357221 | A1* | 12/2016 | Huh | G06F 3/04845 |
| 2017/0228112 | A1* | 8/2017 | Chen | G06F 3/04847 |
| 2017/0293383 | A1* | 10/2017 | Lee | G06F 1/1641 |
| 2019/0187758 | A1* | 6/2019 | Lee | G06F 1/1677 |
| 2020/0175945 | A1* | 6/2020 | Chen | G09G 5/14 |
| 2021/0096675 | A1* | 4/2021 | Klein | G06F 1/162 |
| 2021/0096887 | A1* | 4/2021 | Klein | G09G 5/14 |
| 2022/0374123 | A1* | 11/2022 | Zhang | G06F 1/1647 |

FOREIGN PATENT DOCUMENTS

| | | | |
|---|---|---|---|
| KR | 10-2010-0107377 | A | 10/2010 |
| KR | 20140016082 | A | 2/2014 |
| KR | 10-2014-0046329 | A | 4/2014 |
| KR | 101517082 | B1 | 4/2015 |
| KR | 20150063802 | A | 6/2015 |
| KR | 101575210 | B1 | 12/2015 |
| KR | 20160040909 | A | 4/2016 |
| KR | 20170079549 | A | 7/2017 |
| KR | 102014273 | B1 | 8/2019 |
| KR | 102107134 | B1 | 5/2020 |
| KR | 102116304 | B1 | 5/2020 |

OTHER PUBLICATIONS

Korean Office Action dated Feb. 14, 2025 for KR Application No. 10-2020-0147507.

* cited by examiner

ELECTRONIC DEVICE AND METHOD FOR OPERATING IN FLEX MODE

CROSS-REFERENCE TO RELATED APPLICATIONS

This application is a continuation application of International Application No. PCT/KR2021/016163 designating the United States, filed on Nov. 8, 2021, in the Korean Intellectual Property Receiving Office and claiming priority to Korean Patent Application No. 10-2020-0147507, filed on Nov. 6, 2020, in the Korean Intellectual Property Office, the disclosures of all of which are hereby incorporated by reference herein in their entireties.

BACKGROUND

Field

Certain example embodiments relate to an electronic device and/or method for operating in a flex mode.

Description of Related Art

As display technology advances, a user terminal device with a flexible display has been introduced. The flexible display refers to a display device that may be bent. A glass substrate that encloses a liquid crystal in a typical liquid crystal display (LCD) and an organic light emitting diode (OLED) is replaced by a plastic film, and flexibility is provided to a display such that the display may be folded and unfolded. Since a plastic substrate is used for the flexible display instead of a generally used glass substrate, a low-temperature manufacturing processor may be used instead of a typical manufacturing processor to prevent or reduce damage to the plastic substrate.

The flexible display is thin and light and even strong against an impact. In addition, the flexible display may be curved or bent and manufactured in various shapes. The flexible display may be used especially in industrial fields in which application of typical glass substrate-based displays may be limited or impossible.

In addition, as the flexible display is commercialized, a new interfacing or information displaying method using the bendable or foldable property of the flexible display may be needed.

SUMMARY

An electronic device according to an example embodiment provides a graphic user interface (GUI) in a process of switching between a full view mode and a flex mode.

The electronic device according to an example embodiment may divide a display into a first area and a second area in the flex mode and output a control element to the second area.

The electronic device according to an example embodiment may output some of a plurality of control elements to the second area.

According to an example embodiment, an electronic device may include a display; a bending detector configured to detect bending of the display; a processor electrically connected, directly or indirectly, to the display and the bending detector; and a memory electrically connected, directly or indirectly, to the processor, in which the processor may be configured to divide the display into at least a first area and a second area when entering to a flex mode in response to detecting the bending of the display while an application is executed, output a content element of the application to the first area of the display, and output, to the second area of the display, a control element corresponding to one or more items of a level lower than a first level included by a menu item of the first level that is mapped to the flex mode in the application.

The processor may arrange the control element corresponding to a second level that is lower than the first level according to a predetermined arrangement in the second area and output, to the first area, a content element corresponding to the control element when a user selects the control element of the second level in the second area.

The processor may output, to the second area, a control element corresponding to a third level that is lower than the second level when the user selects the control element of the second level in the second area.

The processor may output, to the second area, control elements corresponding to a plurality of menu items of the first level together with a control element corresponding to an item of a level lower than the first level included by each of the menu items during the flex mode when the menu items are mapped to the flex mode.

During the flex mode, when the user selects one of the menu items of the first level, the processor may output, to the second area, a control element corresponding to an item of a level lower than the first level included by the selected menu item and exclude an output related to the other menu items.

The processor may select a default menu of the menu items of the first level when entering to the flex mode and output, to the second area, a control element corresponding to an item of a second level included by the default menu.

The processor may further output a control element corresponding to a second level included by each of the menu items of the first level to the second area and skip an output of a graphic representation indicating the menu items.

The processor may compare an area of the second area with an area that is occupied by a plurality of control elements to be output to the second area when entering to the flex mode, output all the control elements to the second area when the area that is occupied by the control elements is less than or equal to the area of the second area.

When the area that is occupied by the control elements is greater than the area of the second area when entering to the flex mode, the processor may output some of the control elements to the second area and output an indicator indicating whether there is a remainder of the control elements.

Depending on a menu depth level when entering to the flex mode in a hierarchical menu structure of the application, the processor may output a content element corresponding to the menu depth level to the first area and output a control element corresponding to the menu depth level to the second area.

According to an example embodiment, a method performed by an electronic device may include dividing a display into a first area and a second area when entering to a flex mode in response to detecting bending of the display while an application is executed, outputting a content element of the application to the first area of the display, and outputting, to the second area of the display, a control element corresponding to one or more items of a level lower than a first level included by a menu item of the first level that is mapped to the flex mode in the application.

An electronic device according to an example embodiment, by providing a GUI for a flex mode while switching from a full view mode to the flex mode only in response to detecting bending of a display, may minimize or reduce a control operation until a user reaches an item at a depth desired by the user in a hierarchical menu structure.

The electronic device according to an example embodiment, by outputting a control element to a second area, adjacent to the user's hand, of the display in the flex mode, may minimize or reduce a physical load, applied to the user's hand, for control.

The electronic device according to an example embodiment, by integrally outputting, to the second area, control elements of a plurality of control elements in the flex mode, may simplify a control operation that has been individually required to access each of different functions.

BRIEF DESCRIPTION OF DRAWINGS

The above and other aspects, features, and advantages of certain embodiments of the disclosure will be more apparent from the following detailed description, taken in conjunction with the accompanying drawings, in which.

DETAILED DESCRIPTION

Figure 1:
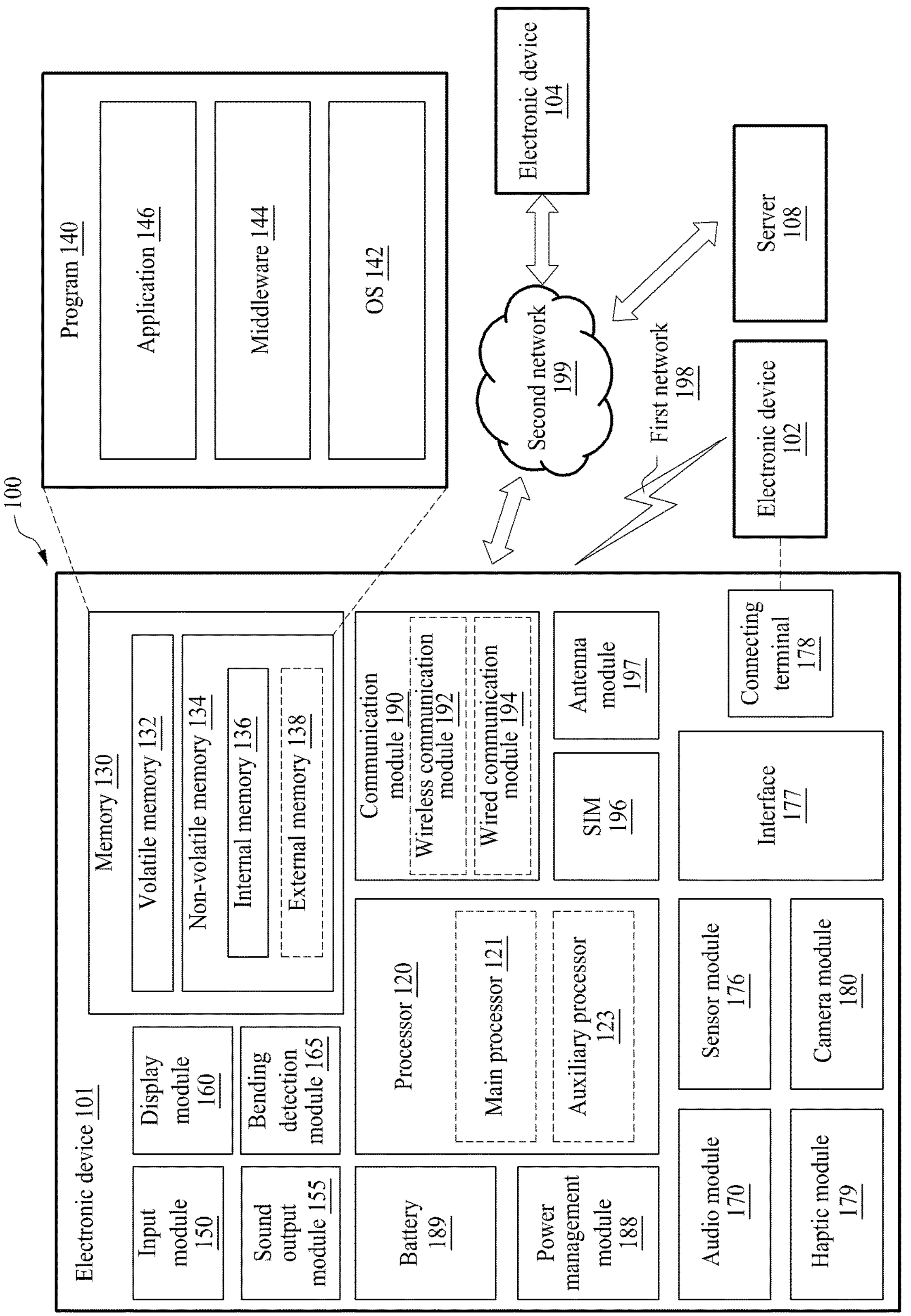
FIG. 1 is a block diagram illustrating a configuration of an electronic device in a network environment, according to an example embodiment.

Hereinafter, embodiments will be described in detail with reference to the accompanying drawings. When describing the embodiments with reference to the accompanying drawings, like reference numerals refer to like elements and a repeated description related thereto will be omitted.

FIG. 1 is a block diagram illustrating an electronic device 101 in a network environment 100, according to various embodiments. Referring to FIG. 1, the electronic device 101 in the network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be integrated as a single component (e.g., the display module 160).

The processor 120 may execute, for example, software (e.g., a program 140) to control at least one other component (e.g., a hardware or software component) of the electronic device 101 connected to the processor 120 and may perform various data processing or computations. According to an embodiment, as at least a part of data processing or computations, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121. The processor 120 may be electrically connected, directly or indirectly, to a display, a bending detection module, and a memory.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is in an active state (e.g., executing an application). According to an embodiment, the auxiliary processor 123 (e.g., an ISP or a CP) may be implemented as a portion of another component (e.g., the camera module 180 or the communication module 190) that is functionally related to the auxiliary processor 123. According to an embodiment, the auxiliary processor 123 (e.g., an NPU) may include a hardware structure specifically for artificial intelligence model processing. An artificial intelligence model may be generated by machine learning. The machine learning may be performed by, for example, the electronic device 101, in which artificial intelligence is performed, or performed via a separate server (e.g., the server 108). Learning algorithms may include, but are not limited to, for example, supervised learning, unsupervised learning, semi-supervised learning, or reinforcement learning. The artificial intelligence (AI) model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may additionally or alternatively include a software structure other than the hardware structure.

The memory 130 may store various pieces of data used by at least one component (e.g., the processor 120 or the sensor module 176) of the electronic device 101. The various pieces of data may include, for example, software (e.g., the program 140) and input data or output data for a command related thereto. The memory 130 may include the volatile memory 132 or the non-volatile memory 134.

The program 140 may be stored as software in the memory 130 and may include, for example, an operating system (OS) 142, middleware 144, or an application 146.

The input module 150 may receive, from outside (e.g., a user) the electronic device 101, a command or data to be used by another component (e.g., the processor 120) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing a recording. The receiver may be used to receive an incoming call. According to an embodiment, the receiver may be implemented separately from the speaker or as a part of the speaker.

The display module 160 may visually provide information to the outside (e.g., a user) of the electronic device 101. The display module 160 may include, for example, a control circuit for controlling a display, a hologram device, or a projector and control circuitry to control a corresponding one of the display, the hologram device, or the projector. According to an embodiment, the display module 160 may include a touch sensor adapted to detect a touch, or a pressure sensor adapted to measure the intensity of force incurred by the touch. The display module 160 may be bendable with respect to an axis, and a bent state of the display module 160 may be detected by a bending detection module 165 described below. An example of the bending of the display module 160 is described with reference to FIG. 3.

The bending detection module 165 may detect the bending of the display of the electronic device 101. The bending detection module 165 may detect, for example, at least one of whether to be bent, a bending speed, a bending angle, and a bending time as a bending state. The bending detection module 165 may be a detection sensor and may detect a bent state of the electronic device 101 by using at least one of a tack switch, a motion detection sensor, and a pressure sensor. For example, the bending detection module 165 may periodically transmit, to the processor 120, a value measured by the detection sensor or the bent state of the electronic device 101 derived from the measured value. As another example, the bending detection module 165 may transmit, to the processor 120, the measured value when the measured value is greater than or equal to a certain threshold or less than or equal to the certain threshold or when an event occurs.

Yet another example, the bending detection module 165 may detect the bent state of the electronic device 101 according to a register value or a capacitor value, of a touch panel, obtained from the display module 160. For example, the bending angle of the electronic device 101 may be detected based on the size of the register value or the capacitor value at a bending part of the touch panel. In addition, the bending speed of the electronic device 101 may be detected based on a changing speed of the register value or the capacitor value. In addition, the bending time of the electronic device 101 may be detected based on a changing time of the register value or the capacitor value. The bending detection module 165 may be also referred to as a bending detector.

The audio module 170 may convert a sound into an electrical signal or vice versa. According to an embodiment, the audio module 170 may obtain the sound via the input module 150 or output the sound via the sound output module 155 or an external electronic device (e.g., the electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101 and generate an electric signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used by the electronic device 101 to couple with the external electronic device (e.g., the electronic device 102) directly (e.g., by wire) or wirelessly. According to an embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may physically connect to an external electronic device (e.g., the electronic device 102). According to an embodiment, the connecting terminal 178 may include, for example, an HDMI connector, a USB connector, an SD card connector, or an audio connector (e.g., a headphones connector).

The haptic module 179 may convert an electric signal into a mechanical stimulus (e.g., a vibration or a movement) or an electrical stimulus, which may be recognized by a user via their tactile sensation or kinesthetic sensation. According to an embodiment, the haptic module 179 may include, for example, a motor, a piezoelectric element, or an electric stimulator.

The camera module 180 may capture a still image and moving images. According to an embodiment, the camera module 180 may include one or more lenses, image sensors, image signal processors, or flashes.

The power management module 188 may manage power supplied to the electronic device 101. According to an embodiment, the power management module 188 may be implemented as, for example, at least a part of a power management integrated circuit (PMIC).

The battery 189 may supply power to at least one component of the electronic device 101. According to an embodiment, the battery 189 may include, for example, a primary cell, which is not rechargeable, a secondary cell, which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., an AP) and that support direct (e.g., wired) communication or wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device, for example, the electronic device 104, via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multiple components (e.g., multiple chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192, comprising communication circuitry, may support a 5G network after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beam-forming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., an antenna array). In such a case, at least one antenna appropriate for a communication scheme used in a communication network, such as the first network 198 or the second network 199, may be selected by, for example, the communication module 190 (comprising communication circuitry) from the plurality of antennas. The signal or power may be transmitted or received between the communication module 190 and the external electronic device via the at least one selected antenna. According to an embodiment, another component (e.g., a radio frequency integrated circuit (RFIC)) other than the radiating element may be additionally formed as a part of the antenna module 197.

According to various embodiments, the antenna module 197 may form a mmWave antenna module. According to an embodiment, the mmWave antenna module may include a PCB, an RFIC on a first surface (e.g., the bottom surface) of the PCB, or adjacent to the first surface of the PCB and capable of supporting a designated high-frequency band (e.g., a mmWave band), and a plurality of antennas (e.g., array antennas) disposed on a second surface (e.g., the top or a side surface) of the PCB, or adjacent to the second surface of the PCB and capable of transmitting or receiving signals of the designated high-frequency band.

At least some of the above-described components may be coupled mutually and exchange signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device (e.g., the electronic device 104) via the server 108 coupled with the second network 199. Each of the external electronic devices (e.g., the electronic device 102 or 104) may be a device of the same type as or a different type from the electronic device 101. According to an embodiment, all or some of operations to be executed by the electronic device 101 may be executed by one or more external electronic devices (e.g., the electronic devices 102 and 104 and the server 108). For example, if the electronic device 101 needs to perform a function or a service automatically, or in response to a request from a user or another device, the electronic device 101, instead of, or in addition to, executing the function or the service, may request the one or more external electronic devices to perform at least part of the function or service. The one or more external electronic devices receiving the request may perform the at least part of the function or service, or an additional function or an additional service related to the request and may transfer a result of the performance to the electronic device 101. The electronic device 101 may provide the result, with or without further processing the result, as at least part of a response to the request. To that end, cloud computing, distributed computing, mobile edge computing (MEC), or client-server computing technology may be used, for example. The electronic device 101 may provide ultra low-latency services using, e.g., distributed computing or MEC. In an example, the external electronic device (e.g., the electronic device 104) may include an Internet-of-things (IoT) device. The server 108 may be an intelligent server using machine learning and/or a neural network. According to an embodiment, the external electronic device (e.g., the electronic device 104) or the server 108 may be included in the second network 199. The electronic device 101 may be applied to intelligent services (e.g., smart home, smart city, smart car, or healthcare) based on 5G communication technology or IoT-related technology.

Figure 2:
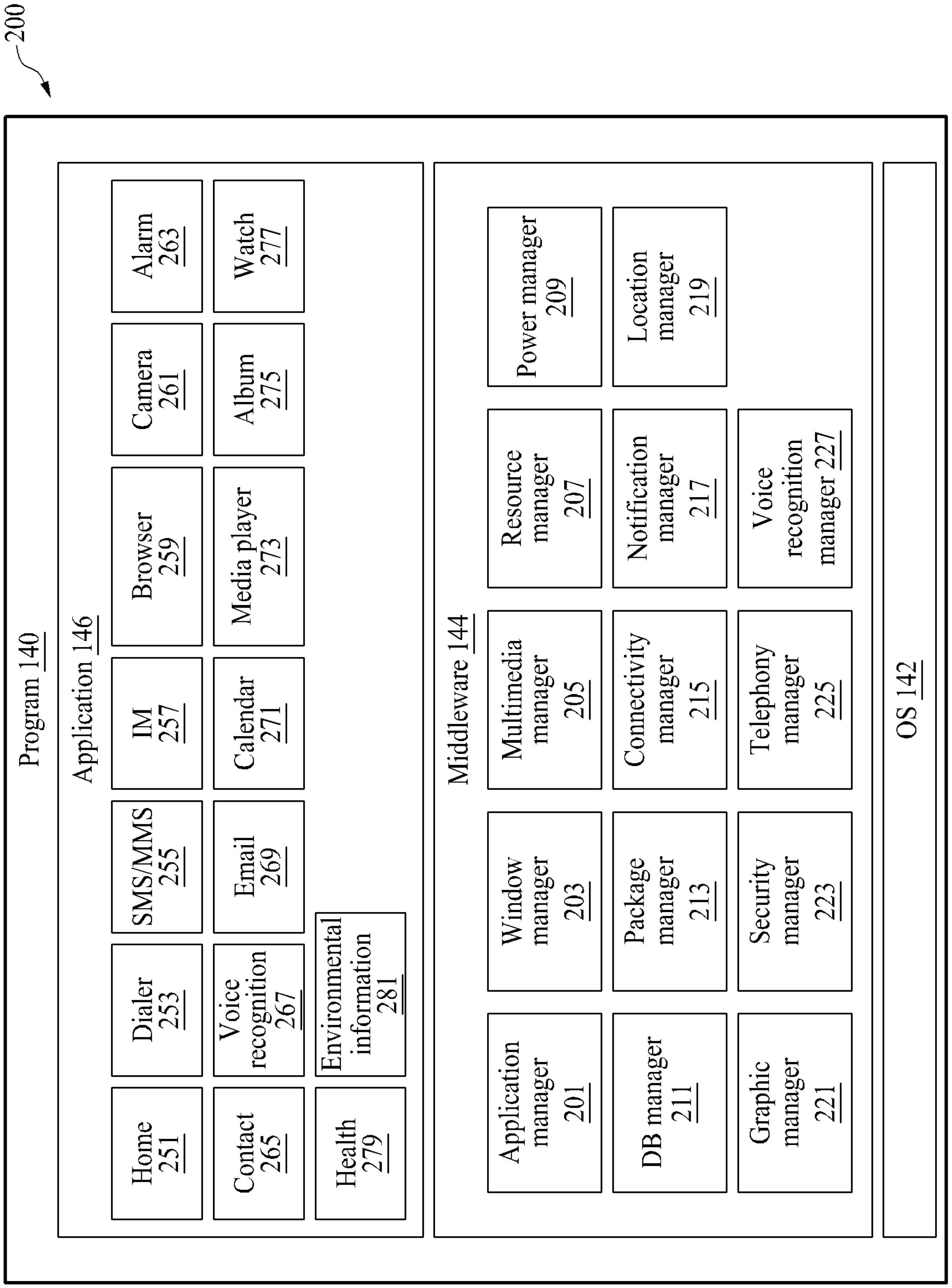
FIG. 2 is a block diagram illustrating a program according to an example embodiment.

FIG. 2 is a block diagram 200 illustrating a program 140 according to various embodiments. According to an embodiment, the program 140 may include an OS 142 to control one or more resources of the electronic device 101, middleware 144, or an application 146 executable in the OS 142. The OS 142 may include, for example, Android™, iOS™, Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocation or deallocation) of one or more system resources (e.g., a process, a memory, or a power source) of the electronic device 101. The OS 142 may additionally or alternatively include one or more other driver programs to drive other hardware devices of the electronic device 101, for example, the input module 150, the sound output module 155, the display module 160, the audio module 170, the sensor module 176, the interface 177, the haptic module 179, the camera module 180, the power management module 188, the battery 189, the communication module 190, the SIM 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database (DB) manager 211, a package manager 213, a connectivity manager 215, a notification manager 217, a location manager 219, a graphic manager 221, a security manager 223, a telephony manager 225, or a voice recognition manager 227.

The application manager 201 may, for example, manage the life cycle of the application 146. The window manager 203, for example, may manage one or more GUI resources that are used on a screen. The multimedia manager 205, for example, may identify one or more formats to be used to play media files, and may encode or decode a media file of the media files using a codec appropriate for a format selected from the one or more formats. The resource manager 207, for example, may manage the source code of the application 146 or a memory space of the memory 130. The power manager 209, for example, may manage the capacity, temperature, or power of the battery 189, and may determine or provide related information to be used for the operation of the electronic device 101, based at least in part on corresponding information of the capacity, temperature, or power of the battery 189. According to an example embodiment, the power manager 209 may interwork with a basic input/output system (BIOS) (not shown) of the electronic device 101.

The DB manager 211, for example, may generate, search, or change a DB to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, a message, or an alert). The location manager 219, for example, may manage location information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit a user's voice data to the server 108 and may receive, from the server 108, a command corresponding to a function to be executed by the electronic device 101, based at least in part on the voice data or text data converted based at least in part on the voice data. According to an example embodiment, the middleware 144 may dynamically delete some existing components or add new components therefrom or thereto. According to an example embodiment, at least part of the middleware 144 may be included as part of the OS 142 or may be implemented as another software separate from the OS 142.

The application 146 may include, for example, a home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to an example embodiment, the application 146 may further include an information exchanging application (not shown) that is capable of supporting information exchange between the electronic device 101 and an external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of an external electronic device that communicates with the electronic device 101, or some component (e.g., a display module or a camera module of the external electronic device) of the external electronic device. The device management application may additionally or alternatively support the installation, deletion, or update of an application being operated on an external electronic device.

The electronic device according to various embodiments may be one of various types of electronic devices. The electronic device may include, for example, a portable communication device (e.g., a smartphone), a computer device, a portable multimedia device, a portable medical device, a camera, a wearable device, or a home appliance device. According to an example embodiment of the disclosure, the electronic device is not limited to those described above.

It should be understood that various embodiments of the present disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things unless the relevant context clearly indicates otherwise. As used herein, "A or B", "at least one of A and B", "at least one of A or B", "A, B or C", "at least one of A, B and C", and "A, B, or C," each of which may include any one of the items listed together in the corresponding one of the phrases, or all possible combinations thereof. Terms such as "first", "second", or "first" or "second" may simply be used to distinguish the component from other components in question, and do not limit the components in other aspects (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., by wire), wirelessly, or via at least a third element(s).

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC). Thus, each "module" herein may comprise circuitry.

Various embodiments as set forth herein may be implemented as software (e.g., the program 140) including one or more instructions that are stored in a storage medium (e.g., the internal memory 136 or the external memory 138) that is readable by a machine (e.g., the electronic device 101). For example, a processor (e.g., the processor 120) of the machine (e.g., the electronic device 101) may invoke at least one of the one or more instructions stored in the storage medium and execute it. This allows the machine to be operated to perform at least one function according to the at least one instruction invoked. The one or more instructions may include code generated by a compiler or code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., a compact disc read-only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as a memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one among the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 3:
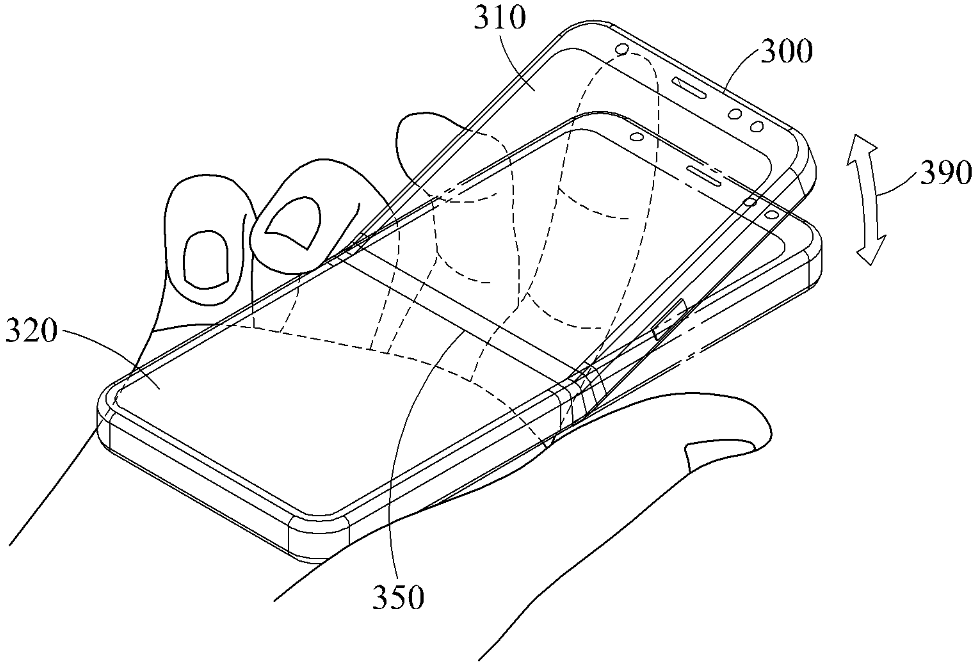
FIG. 3 is a diagram illustrating bending of an electronic device, according to an example embodiment.

FIG. 3 is a diagram illustrating bending of an electronic device, according to an embodiment.

Referring to FIG. 3, an electronic device 300 that is bendable may be implemented as devices for various purposes. For example, the electronic device 300 may include a mobile phone, a smartphone, a laptop computer, a tablet device, an electronic book device, a digital broadcasting device, a personal digital assistant (PDA), a portable multimedia player (PMP), a navigation, or a wearable device, such as a smartwatch, smart glasses, a head-mounted display (HMD), and the like.

A display module of the electronic device 300 that is bendable may include a flexible display. The flexible display may include various displays of which shapes may be transformed by an external force. For example, the flexible display may include a foldable display, a bendable display, a rollable display, and the like, in which the foldable display may be folded or unfolded at a certain angle or curvature, the bendable display may be bent or unbent at a certain curvature, and the rollable display may be rolled into a cylindrical shape. The electronic device 300 may include the flexible display and a bending part (not shown). The bending part (not shown) may include a component for bending the electronic device 300 at a certain angle or curvature and a component for restoring the electronic device 300 in a bent state to an unbent state. The electronic device 300 may further include a bending detector for detecting a bent state of the bending part (not shown).

The flexible display may provide a screen including information having been processed by the electronic device 300 or to be processed thereby. For example, the flexible display may display an execution screen of an application program, a lock screen, a background screen, a home screen, and the like. In addition, the flexible display may also include an input interfacing function of a touchpad or a touch screen. Accordingly, the flexible display may detect a touch input by a user, and the detected touch input may control the electronic device 300.

The electronic device 300 may be bent or unbent with respect to an axis 350 by an external force 390 applied by the user. Bending may be an action of switching an unbent state to a bent state, and unbending may be an action of switching a bent state to an unbent state. When the electronic device 300 is bent, the flexible display may be divided into a first area 310 and a second area 320. The first area 310 may be an area that is positioned on a side (e.g., top) of the flexible display with respect to the axis 350. The second area 320 may be an area that is positioned on the other side (e.g., bottom) of the flexible display with respect to the axis 350.

The unbent state herein may be a fully unfolded state of the flexible display, in which a plane corresponding to the first area 310 of the flexible display and a plane corresponding to the second area 320 of the flexible display may be practically parallel without facing each other. For example, an angle formed by the plane corresponding to the first area 310 and the plane corresponding to the second area 320 in an unbent state may be 180 degrees with respect to the axis 350. The bent state herein may be a partially folded state of the flexible display, in which the plane corresponding to the first area 310 of the flexible display and the plane corresponding to the second area 320 of the flexible display may form an angle within a predetermined angle range (e.g., an angle range from 0 to 180 degrees) with respect to the axis 350. The angle formed in a bent state by the plane corresponding to the first area 310 and the plane corresponding to the second area 320 may be maintained before an external force is additionally applied by the user. As described below, the electronic device 300 may change a view mode of the flexible display when the electronic device 300 is switched between an unbent state and a bent state. A folded state may be a fully folded state of the flexible display such that the first area 310 and the second area 320 may face each other, in which the angle formed by the plane corresponding to the first area 310 and the plane corresponding to the second area 320 may be less than a threshold angle with respect to the axis 350. The electronic device 300 may deactivate the flexible display in a folded state. Hereinafter, the operation of switching from an unbent state to a bent state is mainly described.

In addition, referring to FIG. 3, although the axis 350 is illustrated as being parallel to a horizontal axis of the electronic device 300, the example is just an example embodiment, examples are not limited to the example, and the axis 350 may be parallel to a vertical axis of the electronic device 300 depending on design. In addition, referring to FIG. 3, although a bending axis is illustrated as being one, the example is just an example embodiment, the electronic device 300 may be bent with respect to a plurality of axes, and a display of the electronic device 300 may be divided into areas by an individual axis. The axis 350, being a reference for bending, may also be referred to as a bending axis.

Hereinafter, a method of outputting graphic representations to the first area 310 and the second area 320 by the electronic device 300 according to whether the electronic device 300 enters the flex mode is described.

Figure 4:
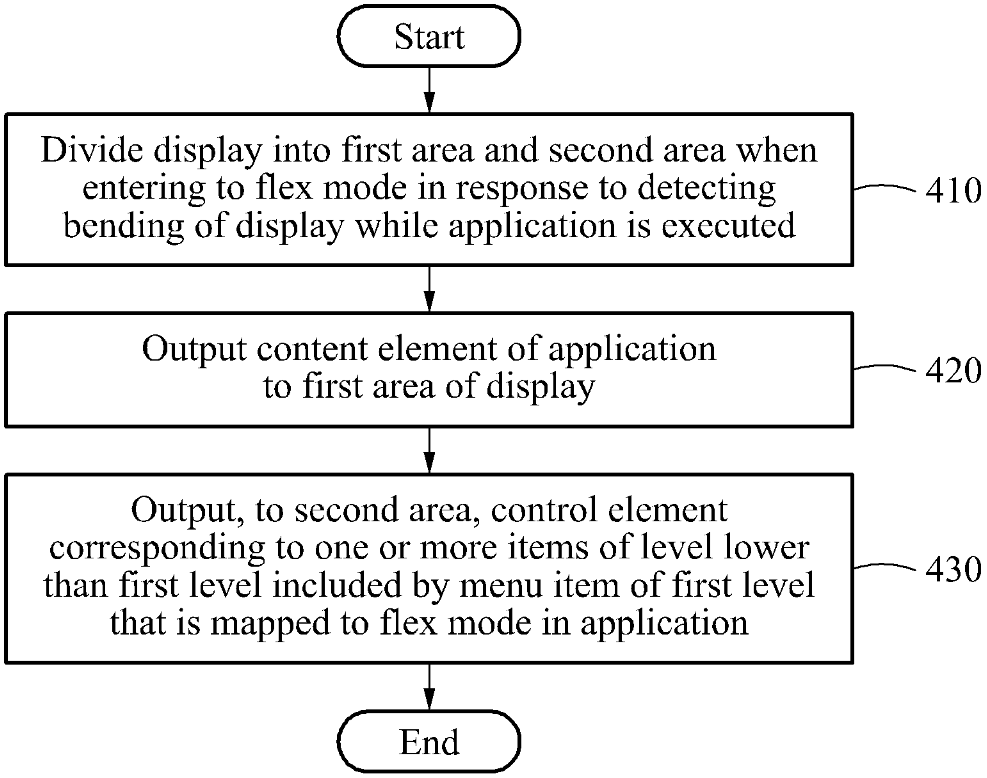
FIG. 4 is a flowchart illustrating an operation of an electronic device in a flex mode, according to an example embodiment.

FIG. 4 is a flowchart illustrating an operation of an electronic device in a flex mode, according to an embodiment.

First, in operation 410, a processor of the electronic device may divide a display into a first area and a second area when entering to the flex mode in response to detecting bending of the display while an application is executed. The flex mode may indicate a view mode operating in a bent state of the electronic device. The electronic device in the flex mode may return to a full view mode by releasing the flex mode when the display in the bent state switches to an unbent state. The full view mode may be a view mode operating in the unbent state of the electronic device in which the entire area of the display may be integrated into a single output area.

Although the first area is described as a content area in which content elements are mainly output, and the second area is described as a control area in which control elements are mainly output for ease of description herein, examples are not limited thereto.

A control element may be output to a portion of the first area, and a content element may be output to a portion of the second area. In addition, although an upper area with respect to a bending axis is mainly described as the first area, and a lower area with respect to the bending axis is mainly described as the second area, examples are not limited thereto. The upper area and some of the lower area with respect to the bending axis may be determined to be the first area and the rest of the lower area may be determined to be the second area. In addition, although the example of the display divided into two areas is mainly described, examples are not limited thereto. The display may be divided into three or more areas, and the electronic device may determine the first area and the second area among the three or more areas.

In operation 420, the electronic device may output a content element of the application to the first area of the display. The content element may be a graphic representation indicating content. For example, the content may include a picture, a video, and text. The electronic device may output the content element to the first area that is smaller than the entire area, for example, by adjusting the size and/or shape of the content element in the full view mode or by cropping some of the content element in the full view mode.

Subsequently, in operation 430, the electronic device may output, to the second area, a control element corresponding to one or more items of a level lower than a first level included by a menu item of the first level that is mapped to the flex mode in the application. The control element may be a graphic representation indicating a control item selectable by a user, and the electronic device may execute an operation and/or function of the application that are/is assigned to the control item when the control item is selected. The operation and/or function of the application assigned to the control item may include, for example, the transforming, changing, and replacing of the content element and/or control element that are/is output to the display. As another example, the operation and/or function of the application assigned to the control item may include the executing of multiple processes, software modules, and other applications. The replacing of the control element may be, for example, an operation of erasing, from the second area, a control element of a certain level that has been output, and instead, outputting a control element of a level lower than the certain level to the second area.

A control menu including control items herein may have a hierarchical structure including a plurality of levels. A level may be a menu depth in the hierarchical structure of the control menu. Each control item may correspond to one of the levels from the highest level to the lowest level of the control menu. For example, an item of a second level may be a level lower than the menu item of the first level. For ease of description, an nth level may be described as a level higher than an n+1th level. Here, n may be an integer greater than or equal to 1.

For reference, one or more menu items may be mapped to the flex mode in one application. Although an example of the first level being the highest level in the hierarchical structure is mainly described herein, examples are not limited thereto. The first level may be an intermediate level between the highest level and the lowest level. For example, when an item of the intermediate level is mapped to the flex mode, the electronic device may output, to the second area, a control element of a level lower than the intermediate level when entering to the flex mode. Hereinafter, in various embodiments, an item of the first level may be referred to as "a", the item of the second level may be referred to as "b", and an item of a third level may be referred to as "c" for better understanding. However, a maximum depth of a menu in a hierarchical structure may not be limited to three levels.

In addition, the one or more menu items mapped to the flex mode in the application may vary depending on settings. For example, the electronic device may map, to the flex mode, an item indicating an operation and/or function selected by the user among various operations and/or functions supported by the application. As another example, the electronic device may record use history information (e.g., a frequency) of an operation and/or function used in the flex mode, and based on the use history information, may map an item indicating a frequently used operation and/or function to the flex mode. The electronic device may map, to the flex mode, an item last used when entering to a previous flex mode in the application.

As described above, the electronic device may output, to the second area, a control element corresponding to an item of a lower level that has not been exposed in the full view mode only by entering to the flex mode. Accordingly, the electronic device, by outputting, to the second area, the control element corresponding to the item of the lower level without additional control, may efficiently decrease a control operation required to access an operation and/or function desired by the user in the application. In addition, the electronic device may output control elements to the second area in the flex mode by using a menu structure of the full view mode without separate management of the menu structure of the full view mode and a menu structure of the flex mode in the application. Therefore, the cost and time required to develop and transform the application by corresponding to the application to the flex mode may be minimized or reduced, and the compatibility of various applications with respect to the flex mode may increase.

Figure 5:
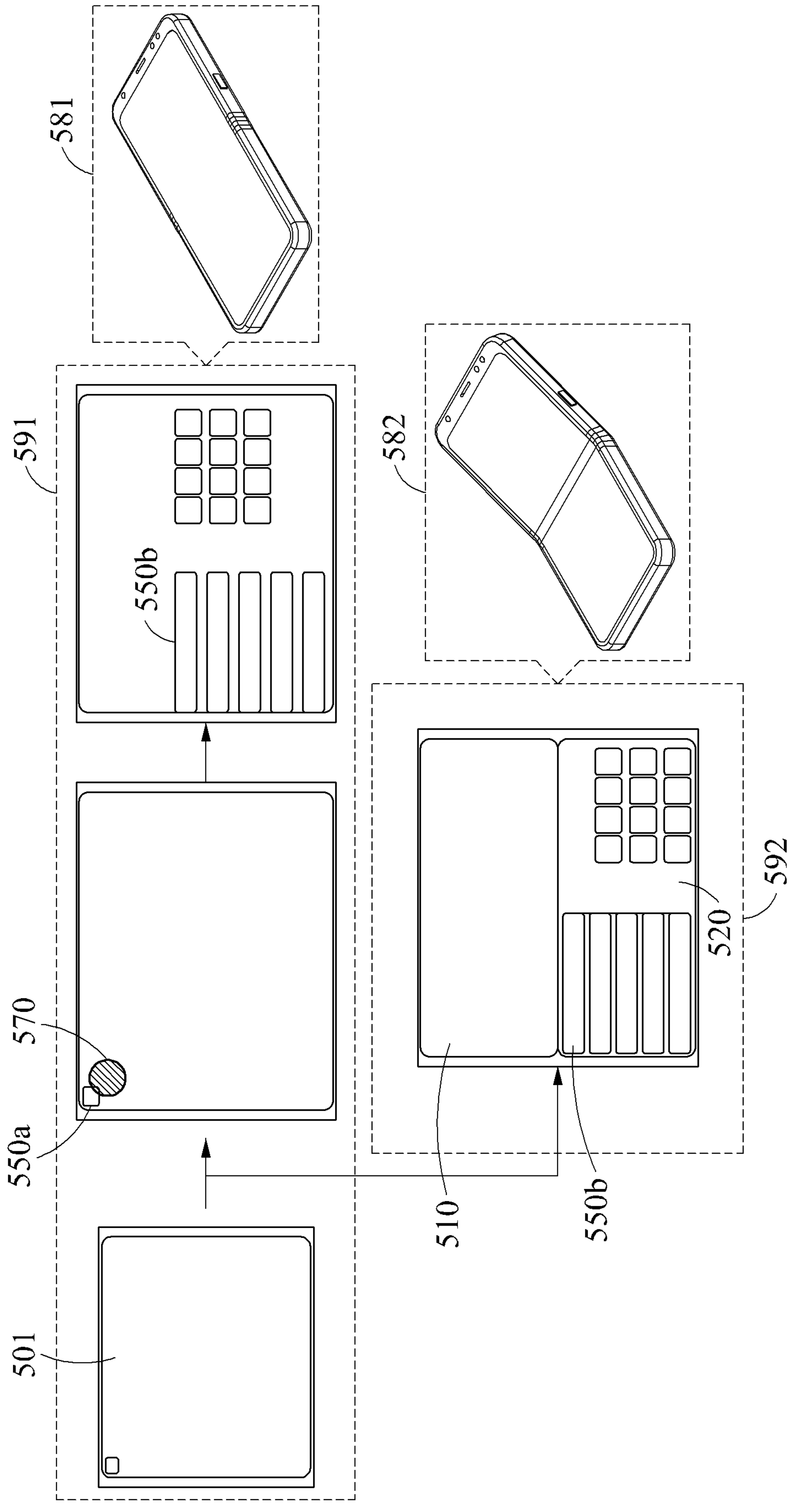
FIG. 5 is a diagram illustrating a display screen by each mode of an electronic device, according to an example embodiment.

FIG. 5 is a diagram illustrating a display screen by each mode of an electronic device, according to an embodiment.

According to an embodiment, the electronic device may operate a display in one of a full view mode 591 and a flex mode 592.

The electronic device in an unbent state 581 may output a content element and a control element by using an entire area 501 of the display in the full view mode 591. A control element corresponding to a menu item of a first level (e.g., the highest level) in a menu structure of an application may be exposed in the full view mode 591. However, a control element 550*b* corresponding to an item of a lower level (e.g., an intermediate level or the lowest level) may be hidden during the full view mode 591 until additional control is performed by a user. The electronic device may output, to the display, the control element 550*b* of the lower level in response to an input 570 of selecting a menu item 550*a* corresponding to the menu item of the first level.

The electronic device in a bent state 582 may divide the display into a first area 510 and a second area 520 in the flex mode 592 and output the content element to the first area 510. In this case, for control convenience of the user, the electronic device may set at least some area at a lower part of the display that is mainly gripped by the user to the second area 520. The electronic device may expose, to the second area 520, the control element 550*b* corresponding to the item of the lower level when entering to the flex mode 592. Accordingly, the electronic device, only by entering to the flex mode 592 without additional control, may immediately provide the user with a control element related to a useful function that is not exposed in the full view mode 591.

FIGS. 6 to 11 are diagrams illustrating an operation of outputting a graphic representation corresponding to an item of a lower level when entering to a flex mode, according to an embodiment.

Figure 6:
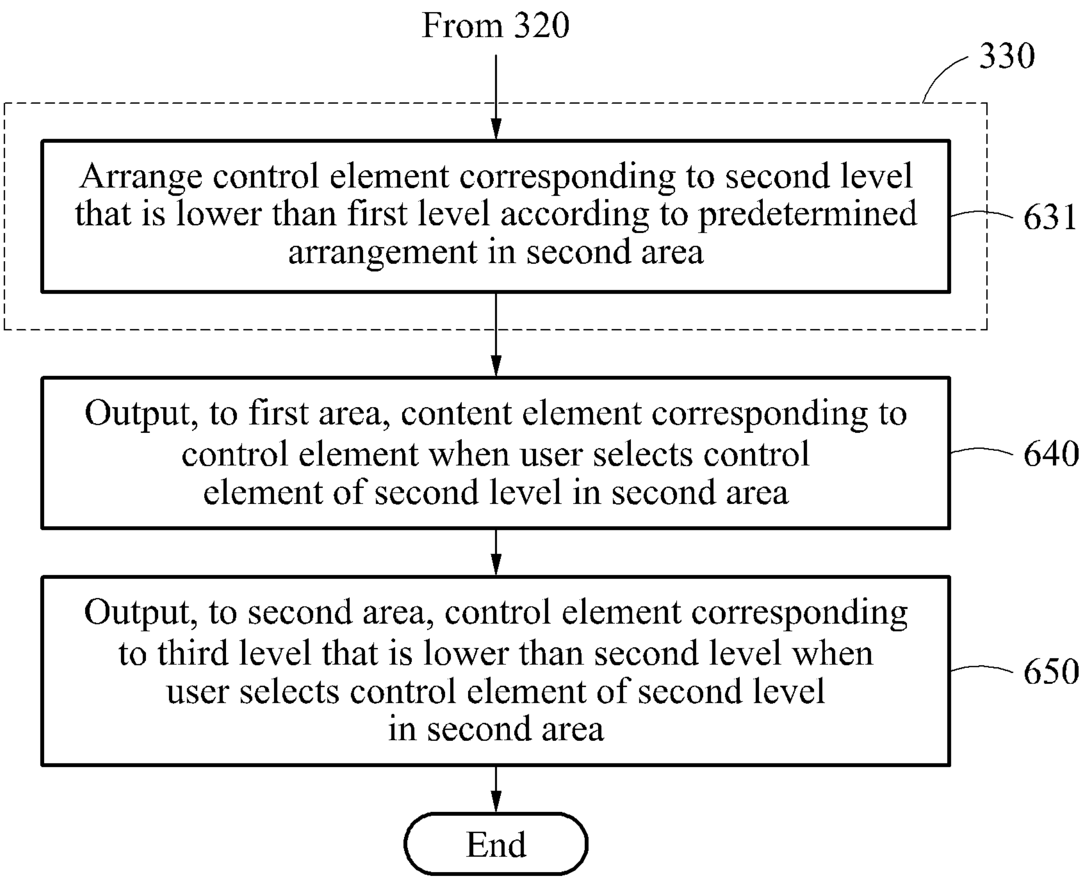
FIGS. 6, 7, 8, 9, 10, and 11 are diagrams illustrating an operation of outputting a graphic representation corresponding to an item of a lower level when entering to a flex mode, according to an example embodiment(s).
Figure 7:
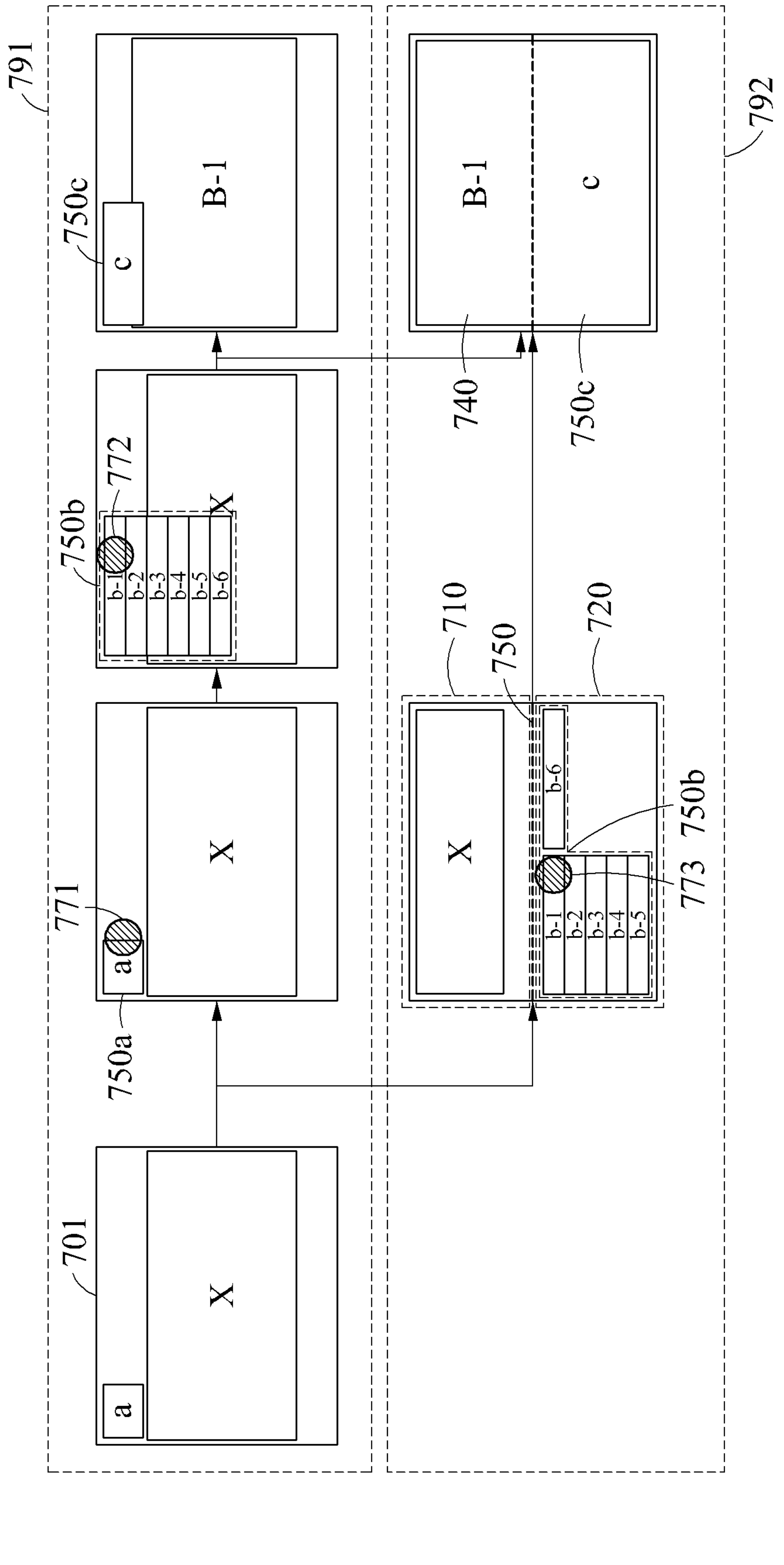

FIG. 6 is a flowchart illustrating a method of outputting a control element of a lower level in a flex mode 792 by an electronic device. In the example illustrated in FIG. 7, a menu structure may include an item a of a first level, items b-1 to b-6 of a second level, and an item c of a third level. The item a of the first level may include the items b-1 to b-6 of the second level, and the item b-1 of the second level may include the item c of the third level. In order for a user to access a control element 750*c* of the third level in a full view mode 791, a selection input 771 for a control element 750*a* of the first level and a selection input 772 for one of control elements 750*b* of the second level may need to be performed, and respective graphic representations corresponding to menu depth levels at each time may be sequentially output to an entire area 701. On the other hand, in the flex mode 792 according to the method illustrated in FIG. 6, a control operation required to access the control element of the lower level may decrease.

A menu depth level herein may be a level indicating the depth of an item accessible by the user at a certain time in a process of exploring items of a menu in a hierarchical structure in the electronic device through control by the user. According to an embodiment, the menu depth level may correspond to a level of a control element output to the display of the electronic device at a time. For example, the electronic device may determine, to be a current menu depth level, the lowest level among levels of a plurality of items output to the display.

First, in operation 631, the electronic device may arrange a control element corresponding to the second level that is lower than the first level according to a predetermined arrangement in a second area 720. The predetermined arrangement may be an order in which items are arranged in the second area 720 by each output format of the items.

For example, when items of a certain level are output in a list view, the items may be arranged from top to bottom in a first direction (e.g., a direction perpendicular to a bending axis 750) in the second area 720. In this case, the items may be arranged in a plurality of columns in the second area 720 according to the width of respective graphic representations corresponding to the items. When the items are arranged in the columns, the electronic device may fill the items from the leftmost column to the right column. In the example illustrated in FIG. 7, the items b-1 to b-5 may be arranged in a first column in the first direction and the item b-6 may be arranged in a second column among the control elements 750*b* of the second level output in a list view.

As another example, when items are output in a dashboard view, the items may be arranged from left to right in a second direction (e.g., a direction parallel to the bending axis 750) in the second area 720.

Yet another example, when items area output in an icon view, the items may be arranged in a plurality of rows in the second area 720. When the items are arranged in the rows, the electronic device may fill the items from a top row to a bottom row. The items may be arranged from left to right in the second direction in each row.

In operation 640, the electronic device may output, to a first area 710, a content element corresponding to a control element when the user selects the control element of the second level in the second area 720. For example, in the example illustrated in FIG. 7, the electronic device may detect a selection input 773 for the item b-1 among the control elements 750*b* of the second level. The electronic device may output, to the first area 710, a content element B-1 740 corresponding to the item b-1 that is selected. However, although a content element corresponding to a selected item is illustrated as being output to the first area 710 in FIG. 7, examples are not limited thereto, and the content element may be output to a portion of the second area 720.

Subsequently, in operation 650, the electronic device may output, to the second area 720, a control element corresponding to the third level that is lower than the second level when the user selects the control element of the second level in the second area 720. According to an embodiment, the electronic device may output, to the second area 720, the control element of the third level included by a selected control element among the control elements of the second level. For example, in the example illustrated in FIG. 7, the electronic device may output, to the second area 720, the control element 750*c* indicating the item c of the lower level included by the item b-1 that is selected. In addition, according to a menu depth level at a time when entering to the flex mode 792 in a hierarchical menu structure of an application, the electronic device may output, to the first area 710, a content element corresponding to the menu depth level at the time. The electronic device may output, to the second area 720, the control element corresponding to the menu depth level. The menu depth level may correspond to a level of a control element currently output to the display by the electronic device. For example, the electronic device may determine a level of an item output in the full view mode 791 to be a current menu depth level. When an item of a plurality of levels are output in the full view mode 791, the electronic device may determine the lowest level of the levels to be the current menu depth level.

Although an example of entering to the flex mode mainly at the highest level by the electronic device is described herein, examples are not limited thereto. The electronic device may switch from a full view mode to the flex mode at a time when bending is detected at whichever level of a plurality of levels included by a menu structure. In the example above, the operation of entering to the flex mode 792 by the electronic device when the menu depth level is the first level is described. When the electronic device enters to the flex mode 792 when the menu depth level is the third level, the electronic device may output, to the second area 720, the control element 750*c* of the third level. In various embodiments to be described below, the electronic device may determine a control element to be output to the second area 720 when entering to the flex mode 792, based on the current menu depth level.

Figure 8:
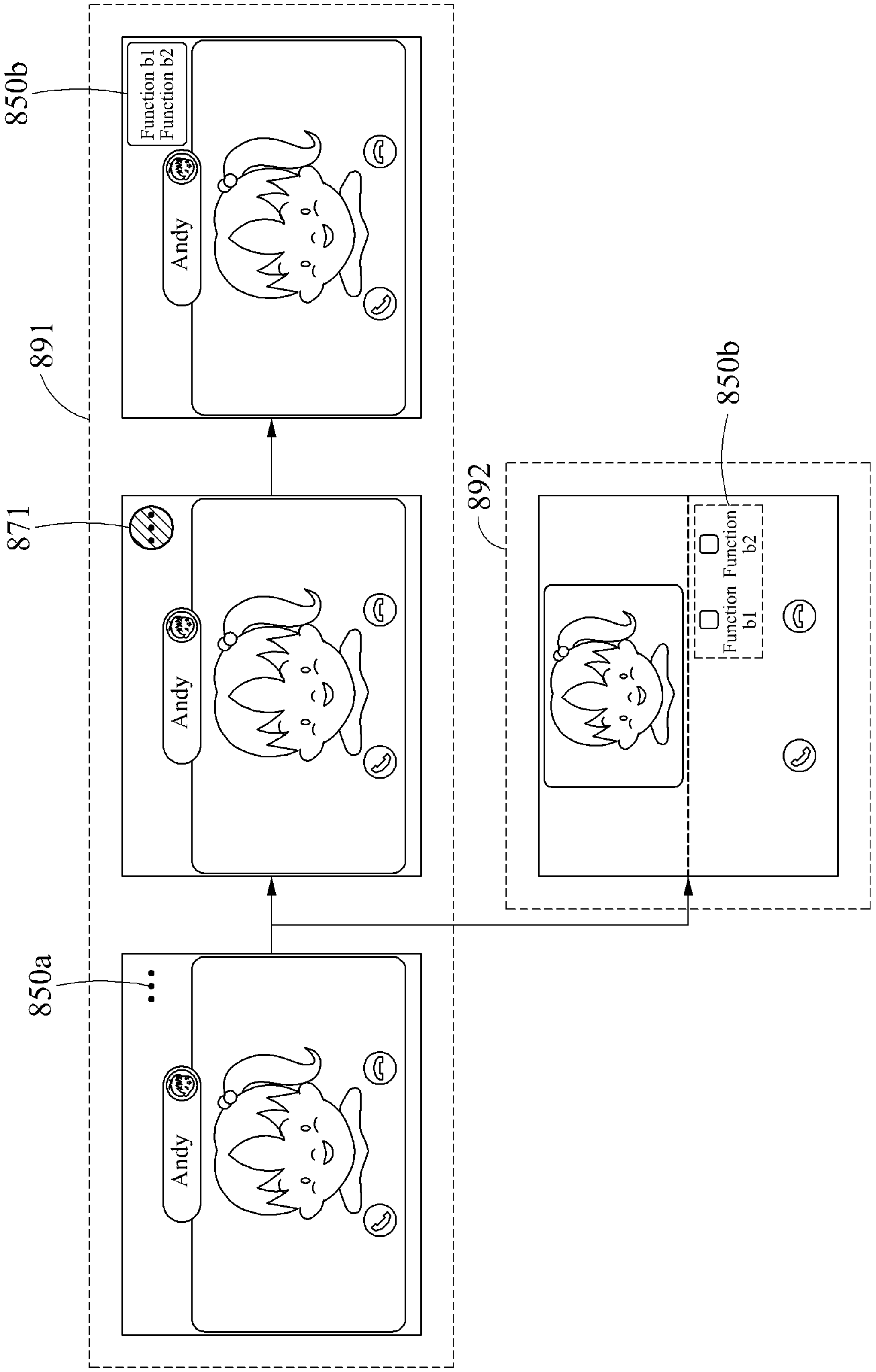

FIG. 8 is a diagram illustrating an operation of a video call application upon receiving a call.

The electronic device may output a menu item 850*a* of the first level together with a content element (e.g., a profile photo of a person on the other end) related to a video call when receiving the video call in a full view mode 891. The electronic device may output control elements 850*b* of the second level included by the menu item 850*a* in response to detecting a selection input 871 for the menu item 850*a*. In the example illustrated in FIG. 8, the control elements 850*b* of the second level may include functions b1 and b2.

When entering to a flex mode 892 while the video call is incoming, the electronic device may output, to a second area, the control elements 850*b* of the second level. In addition, the electronic device may output, to the second area, the control elements 850*b* of the second level when the video call is incoming when the electronic device is already in the flex mode 892. In this case, the electronic device may output, to the second area, another control element (e.g., a call acceptance object and a call rejection object) that is output in the full view mode 891, besides the control elements 850*b* included by the menu item 850*a* of the first level. When the other control element is at an upper area of the display in the full view mode 891, the electronic device may move the other control element to the second area of the display in the flex mode 892. When the other control element is at a lower area of the display in the full view mode 891, the electronic device may maintain the position of the other control element and output the other control element to the second area. However, examples are not limited to the foregoing examples, and the position of control elements in the second area may vary depending on design.

Figure 9:
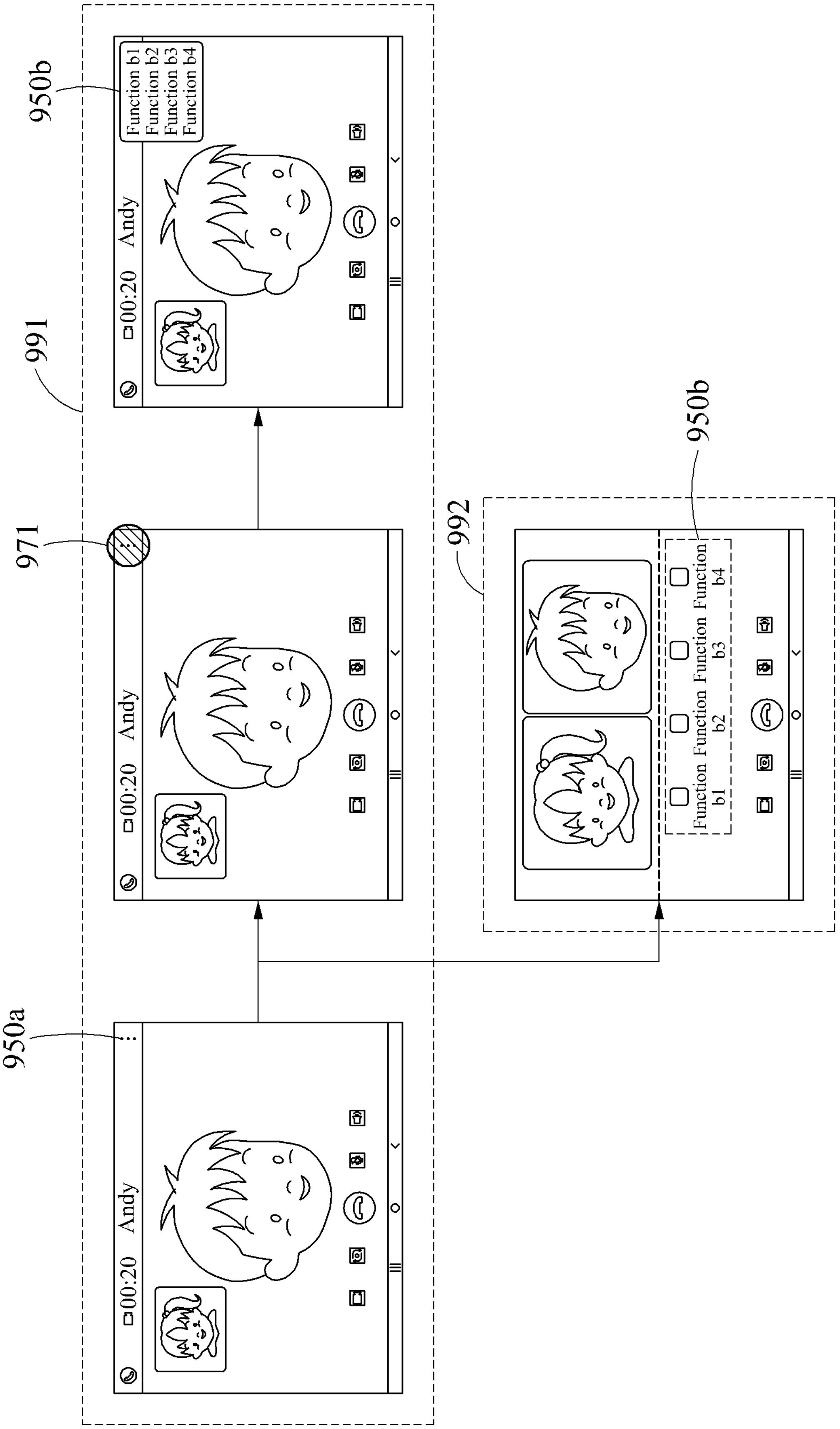

FIG. 9 is a diagram illustrating an operation of a video call application during a call.

The electronic device may output a menu item 950*a* of the first level together with a content element (e.g., a video of the person on the other end received from an electronic device of the person) related to a video call during the video call in a full view mode 991. The electronic device may output control elements 950*b* of the second level included by the menu item 950*a* in response to detecting a selection input 971 for the menu item 950*a*. In the example illustrated in FIG. 9, the control elements 950*b* of the second level may be controllable graphic objects for triggering the execution of functions b1 to b4.

The electronic device may output, to the second area, the control elements 950*b* of the second level during the video call in a flex mode 992. Similar to the description provided with reference to FIG. 8, the electronic device may output, to the second area, another control element (e.g., a call end object, a mute object, etc.) exposed at the first level together with the control elements 950*b* hidden at the first level.

Figure 10:
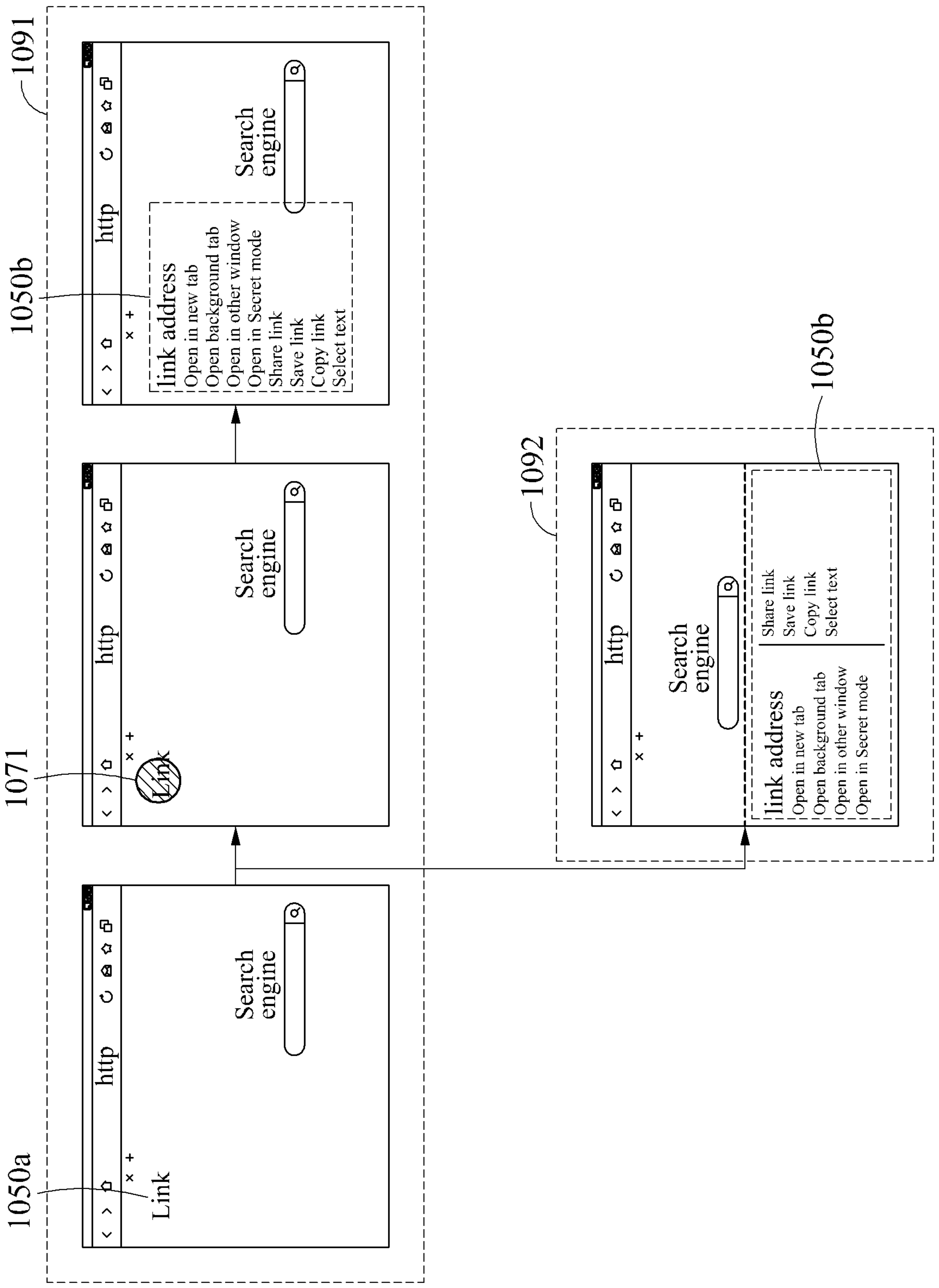

FIG. 10 is a diagram illustrating an operation of a web browser application with respect to a link.

The electronic device may output a website accessed through a web browser in a full view mode 1091. The electronic device may output control elements 1050*b* of the second level in response to detecting a certain user input 1071 for an object 1050*a* indicating a link included by the website. In the web browser application, each link item included by the website may be a menu item of the first level. For example, the electronic device may output control elements 1050*b* of the second level corresponding to the link when a selection input for the link exceeds a threshold time length. For example, an item of the second level corresponding to the link of the website in the web browser application may include operations of connecting to the link, opening the link in a new tab, opening the link in a background tab, opening the link in another window, opening the link in a secret mode, sharing the link, saving the link, copying the link, and selecting text corresponding to the link.

When one of a plurality of links included by the website is selected, the electronic device in a flex mode 1092 may immediately output the control elements 1050*b* of the second level for the selected link. In the full view mode 1091 described above, the selection input for the link may need to be maintained until exceeding the threshold time length in order to output the control elements 1050*b* corresponding to the item of the second level corresponding to the link. Conversely, the electronic device entering to the flex mode 1092 may output the control elements 1050*b* of the second level only when a link is selected regardless of a time of maintaining a selection input. Accordingly, a control time required to access a function and/or operation desired by a user may decrease. For reference, although the control elements 1050*b* of the second level with respect to the link are illustrated as being output in a list view in FIG. 10, examples are not limited thereto, and an output format of control elements may vary depending on design.

Figure 11:
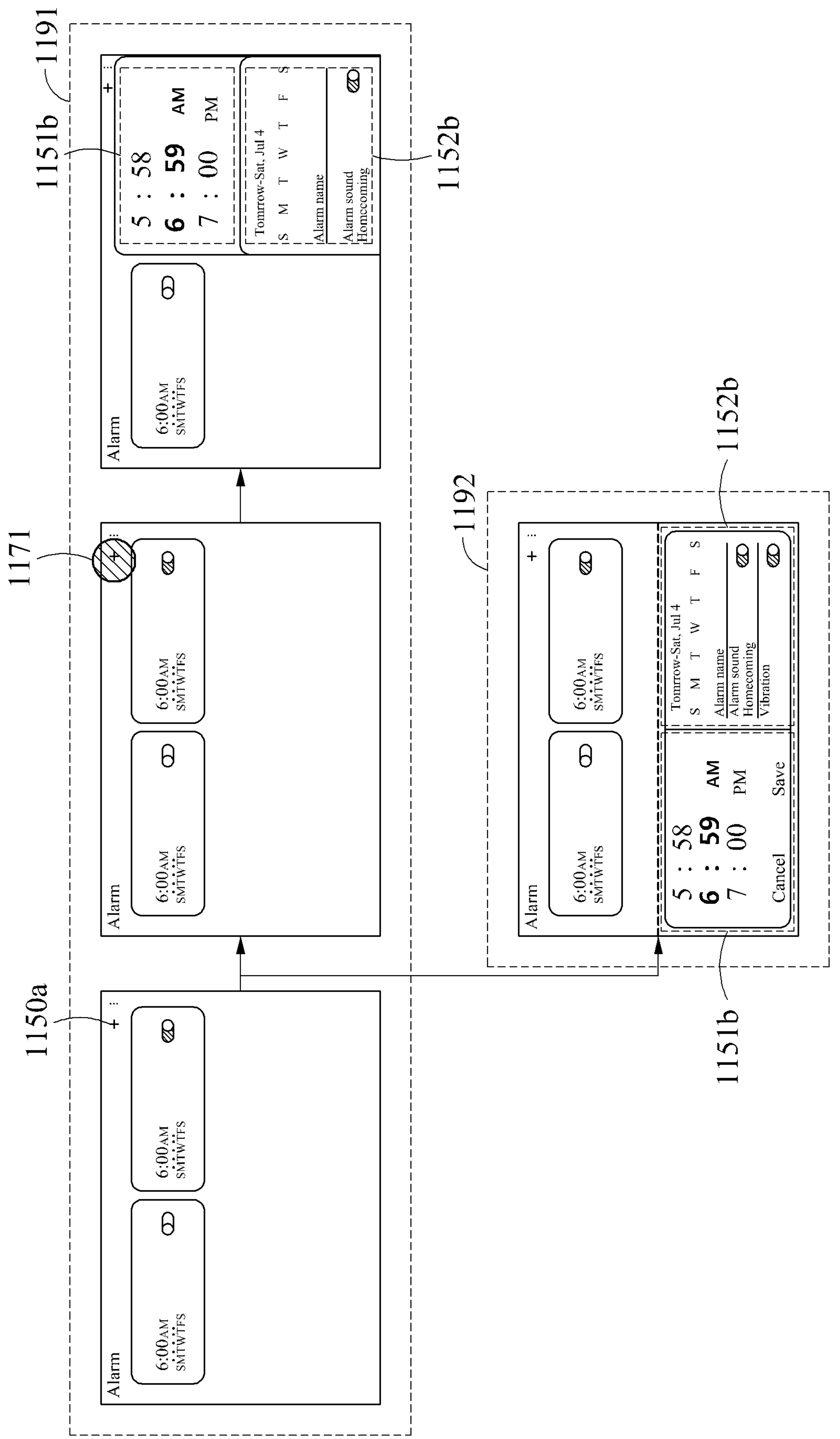

FIG. 11 is a diagram illustrating an additional operation in an alarm application.

The electronic device may output a menu item 1150*a* of the first level, which provides a list of current set alarms and a function for adding an alarm, in a full view mode 1191. The electronic device may output a first control element 1151*b* of the second level that is lower than the level of the menu item 1150*a* and a second control element 1152*b* of the second level in response to detecting a user input 1171 for the menu item 1150*a*. The first control element 1151*b* may include an interface related to an alarm time setting, and the second control element 1152*b* may include an interface related to the setting of an alarm repetition, an alarm name, an alarm sound, and a vibration.

When the electronic device enters to a flex mode 1192 from the full view mode 1191, the electronic device may output the list of current set alarms to a first area as a content element. The electronic device may output, to a second area, the first control element 1151*b* of the second level and the second control element 1152*b* of the second level. Although the first control element 1151*b* and the second control element 1152*b* are illustrated as being output in a dashboard view and arranged parallel to a bending axis in the second area in FIG. 11, which is just an example, an output format of control elements is not limited thereto.

Figure 12:
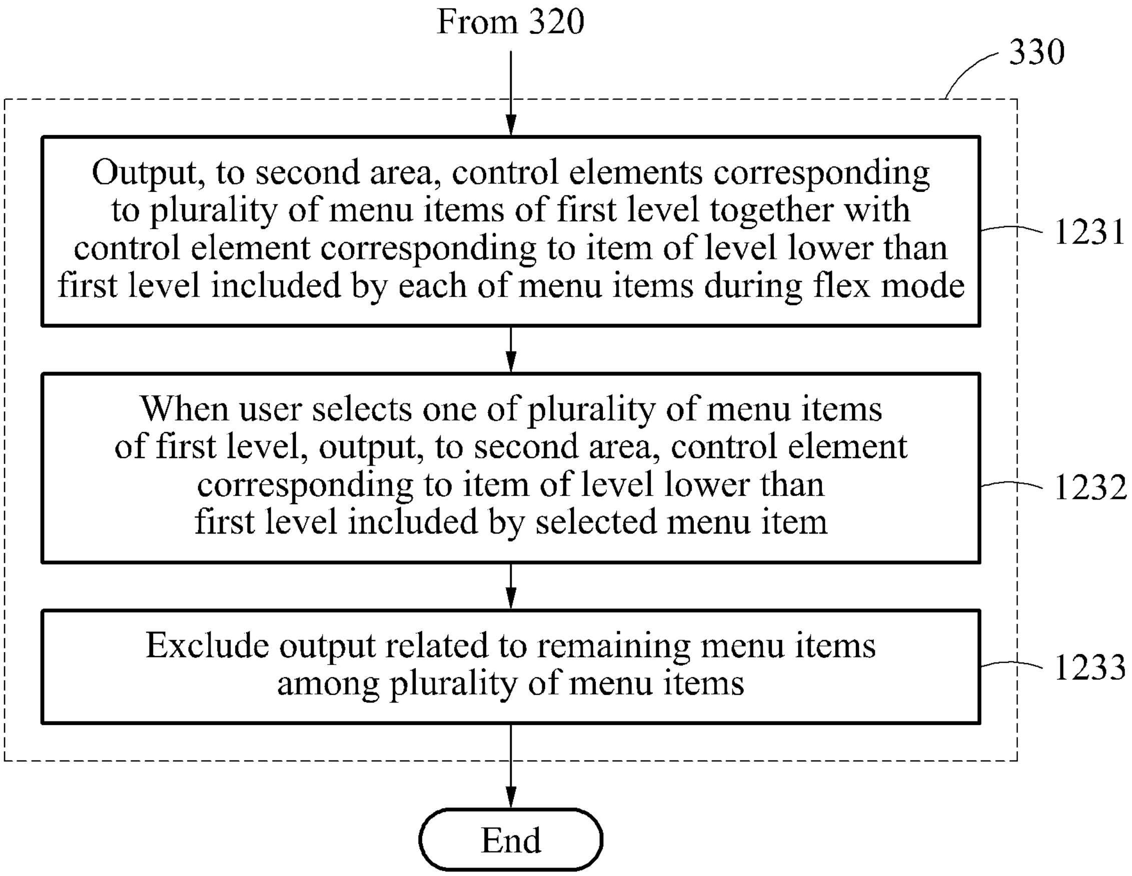
FIGS. 12 to 13 are diagrams illustrating an operation of outputting a graphic representation corresponding to an item of a lower level when entering to a flex mode, according to another example embodiment.
Figure 13:
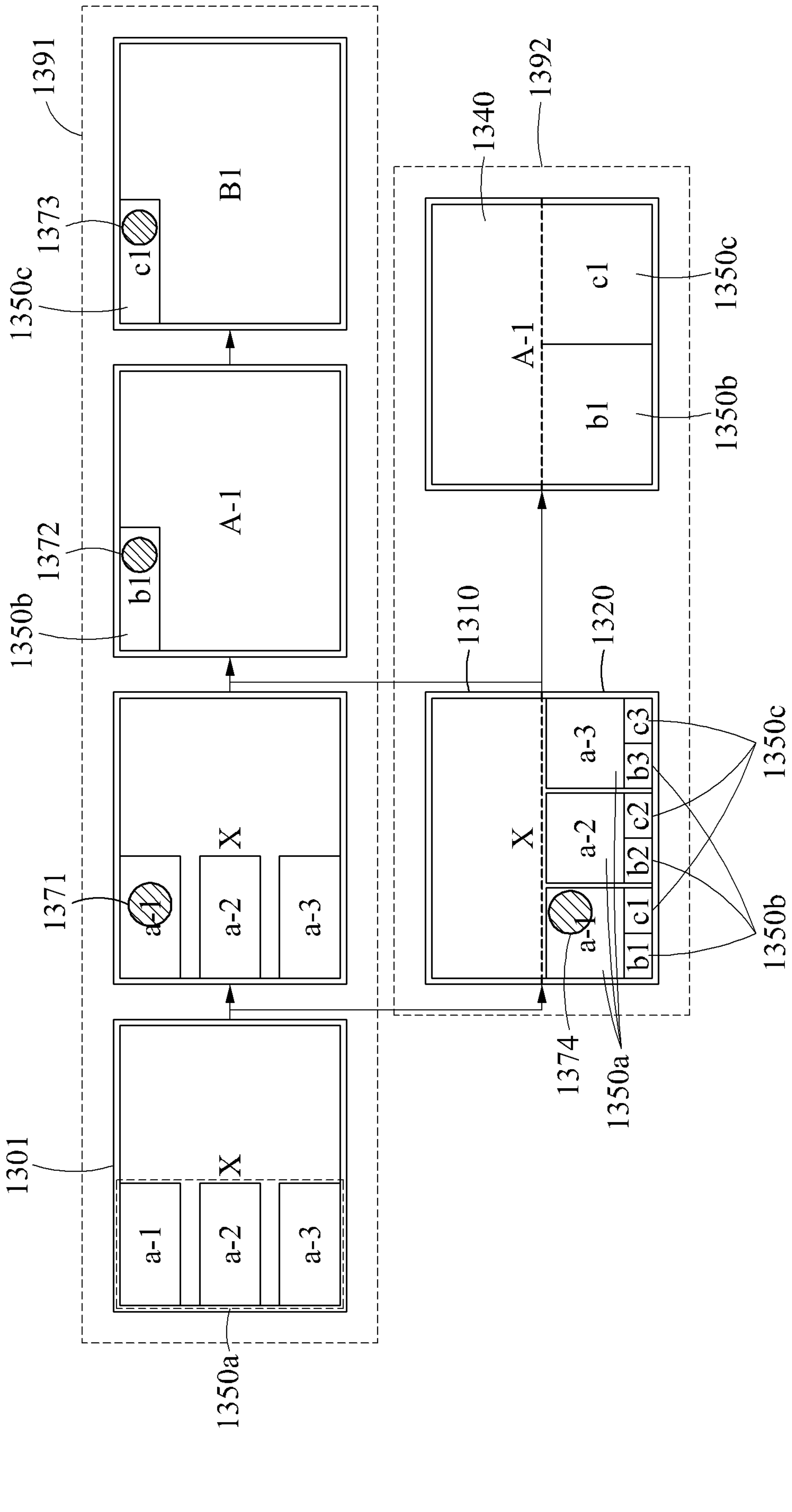

FIGS. 12 to 13 are diagrams illustrating an operation of outputting a graphic representation corresponding to an item of a lower level when entering to a flex mode, according to another embodiment.

FIG. 12 is a flowchart illustrating an output method when a plurality of menu items is mapped to a flex mode 1392. In the example illustrated in FIG. 13, a menu structure may include menu items a-1, a-2, and a-3 of a first level, items b1, b2, and b3 of a second level, and items c1, c2, and c3 of a third level. The menu item a-1 of the first level may include the item b1 of the second level, and the item b1 of the second level may include the item c1 of the third level. Similarly, the menu item a-3 may include the item b3, the item b3 may include the item c3, the menu item a-2 may include the item b2, and the item b2 may include the item c2. In a full view mode 1391, a selection input 1371 for one of control elements 1350*a* of the first level and a selection input 1372 for a control element 1350*b* of the second level may need to be performed to sequentially output graphic representations corresponding to a menu depth level at each time to an entire area 1301, and a user may perform an input 1373 for a control element 1350*c* of the third level. Conversely, in the flex mode 1392 in FIG. 13, a control operation required to access a control element of a lower level may decrease.

First, in operation 1231, an electronic device may output, to a second area 1320, control elements corresponding to a plurality of menu items of the first level together with a control element corresponding to an item of a level lower than the first level included by each of the menu items during the flex mode 1392 when the menu items are mapped to the flex mode 1392. For example, in the example illustrated in FIG. 13, when entering to the flex mode 1392, the electronic device may output, to the second area 1320, the control elements 1350*a* corresponding to the menu items a-1, a-2, and a-3 of the first level, the control elements 1350*b* corresponding to the items b1, b2, and b3 of the second level, and the control elements 1350*c* corresponding to the items c1, c2, and c3 of the third level all together. Accordingly, the electronic device may intuitively provide the user with information on and access to control elements of a level lower than the level of each menu item without individually selecting each menu item of the first level. For reference, the control elements of FIG. 13 may be output in a dashboard view, and each menu item and control elements at a level lower than the level of each menu item may be grouped and output. For example, the electronic device may group the item a-1 of the first level, the item b1 of the second level, and the item c1 of the third level into a dashboard object and output the dashboard object. The dashboard object may be arranged parallel to a bending axis.

Then, in operation 1232, during the flex mode 1392, when the user selects one of a plurality of menu items of the first level, the electronic device may output, to the second area 1320, a control element corresponding to an item of a level lower than the first level included by the selected menu item. In this case, the electronic device in the flex mode 1392 may output a graphic representation corresponding to a menu item in the second area 1320 and receive a selection input in the second area 1320. For example, in the example illustrated in FIG. 13, the electronic device, during the flex mode 1392, in response to detecting an input 1374 of selecting the menu item a-1 among the menu items a-1, a-2, and a-3 of the first level, may output, to the second area 1320, the control element 1350*b* corresponding to the item b1 of a lower level included by the selected menu item a-1 and the control element 1350*c* corresponding to the item c1. In this case, the electronic device may erase the control element 1350*a* corresponding to the selected menu item a-1 from the second area 1320 and output, to the first area 1310, a content element A-1 1340 corresponding to the selected menu item a-1.

In addition, the electronic device, when entering to the flex mode 1392 while one of the menu items of the first level is selected, may output, to the first area 1310, a content element corresponding to the selected menu item and output, to the second area 1320, the control elements 1350*b* and 1350*c* of a level lower than the level of the selected menu item. Accordingly, the electronic device may immediately output, to the second area 1320, a control element corresponding to a menu depth level at a time when entering to the flex mode 1392 while searching for a menu to access a control element of a level desired by the user.

Subsequently, in operation 1233, the electronic device may exclude an output related to the remaining menu items among a plurality of menu items. For example, in the example illustrated in FIG. 13, the electronic device may stop an output of control elements corresponding to the menu items a-2 and a-3 that are not selected and the items b2, b3, c2, and c3 of a level lower than the level of the menu items a-2 and a-3.

For reference, although a control element is mainly described as being arranged in the second area 1320 and output to the second area 1320 in FIGS. 6 to 13, examples are not limited thereto. The electronic device may output a content element (e.g., a preview image related to a control element, etc.) to some of the second area 1320 and may change the content element that is output to some of the second area 1320 in response to selection of a control element, a change of a menu depth level at each time in an application, and the like.

Figure 14:
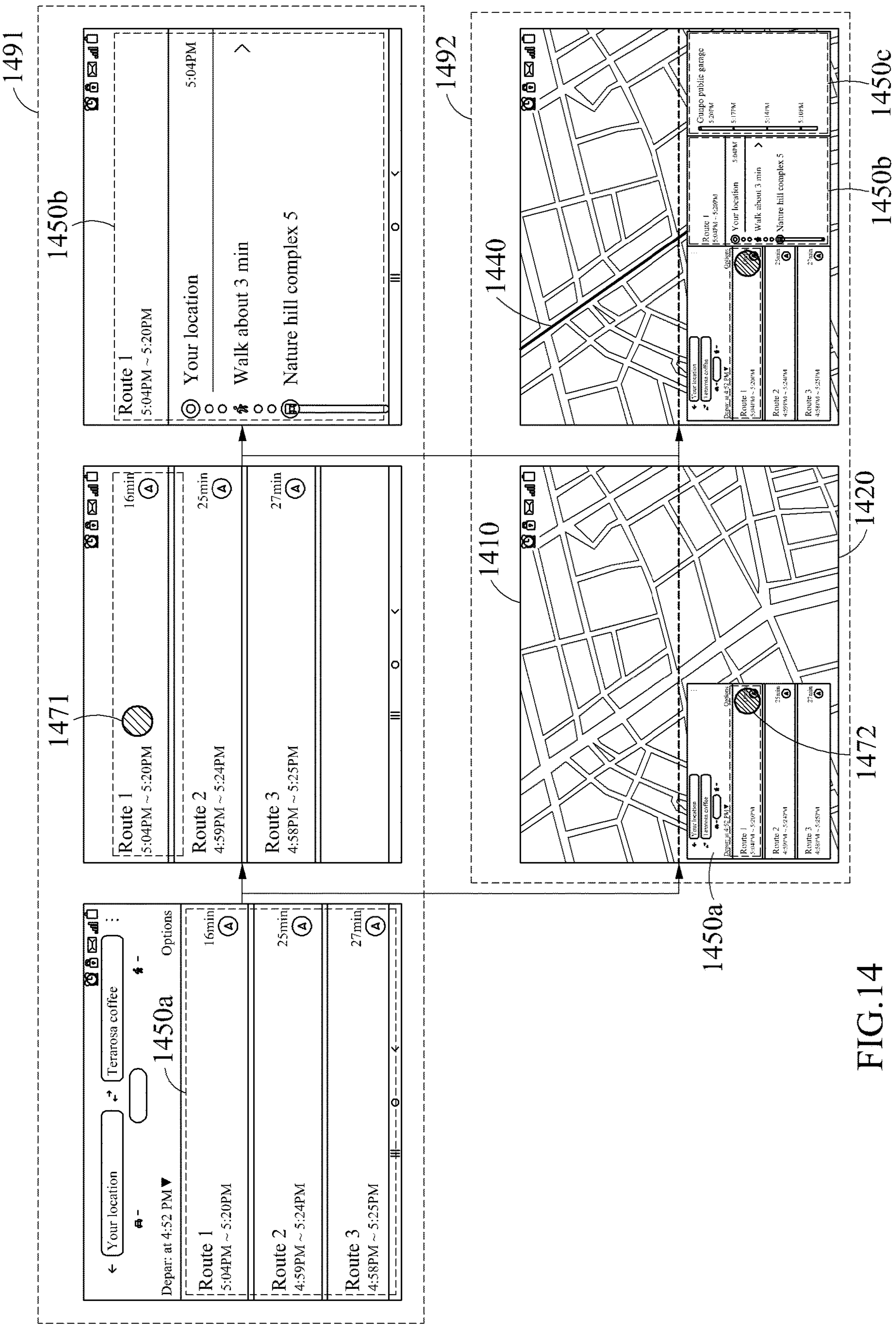
FIG. 14 illustrates an example of an operation of a map application executed by an electronic device in a flex mode.

FIG. 14 illustrates an example of an operation of a map application executed by an electronic device in a flex mode.

The electronic device executing the map application may output menu items 1450*a* of a first level indicating a plurality of routes to a destination that is searched for by a user in a full view mode 1491. In response to detecting a selection input 1471 for a route item of the menu items 1450*a*, the electronic device may output detailed route information 1450*b* of a second level of the selected route item.

When entering to a flex mode 1492, the electronic device may output a map content element to a first area 1410 and output the map content element to some of a second area 1420. The electronic device may output the menu items 1450*a* of the first level indicating the routes to some of the second area 1420. Accordingly, although limited information is provided to the user in the full view mode 1491, the electronic device in the flex mode 1492 may provide the user with the map content element representing a surrounding terrain related to a route together with the menu items 1450*a* respectively corresponding to the routes. In addition, in response to detecting a selection input 1472 for a route item of the menu items 1450*a*, the electronic device may output additional information 1450*c* related to a route of a third level included by the detailed route information 1450*b* together with the detailed route information 1450*b* of the second level. The detailed route information 1450*b* may include information on stops needed to be passed through to reach the destination from a starting point, and the additional information 1450*c* related to the route may include information, such as an arrival time of means of transportation at each stop, as information on the means of transportation available at each stop. In addition, the electronic device may output, to the first area 1410, a content element 1440 indicating a route corresponding to the selected route item.

Accordingly, the electronic device may immediately provide the user with summary information to detailed information related to the route only by entering to the flex mode 1492 without additional control.

FIGS. 15 to 18 are diagrams illustrating an operation of outputting a graphic representation corresponding to an item of a lower level when entering to a flex mode, according to yet another embodiment.

Figure 15:
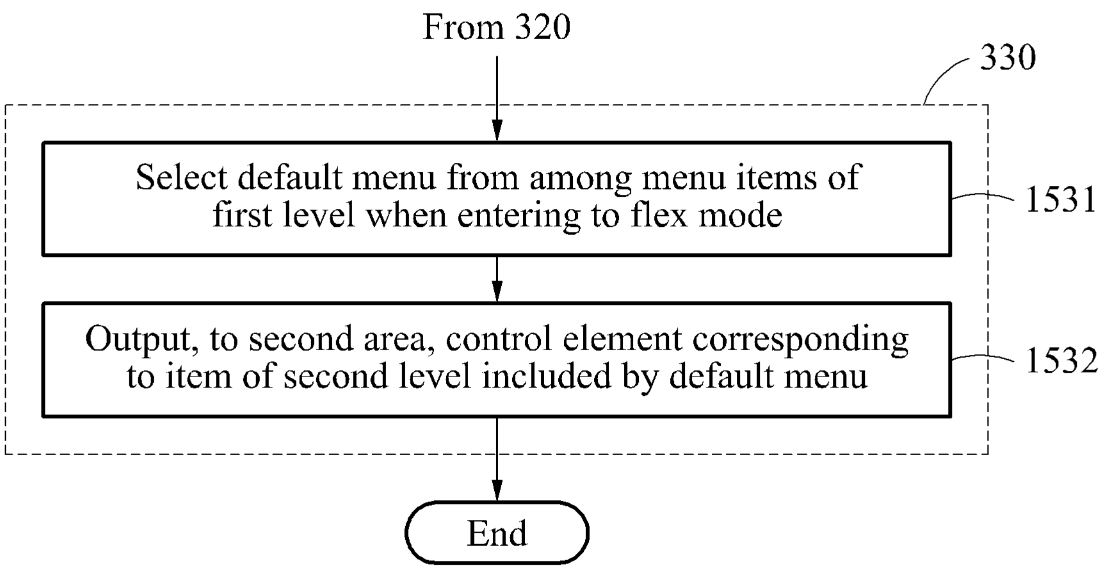
FIGS. 15, 16, 17, and 18 are diagrams illustrating an operation of outputting a graphic representation corresponding to an item of a lower level when entering to a flex mode, according to yet another example embodiment(s).
Figure 16:
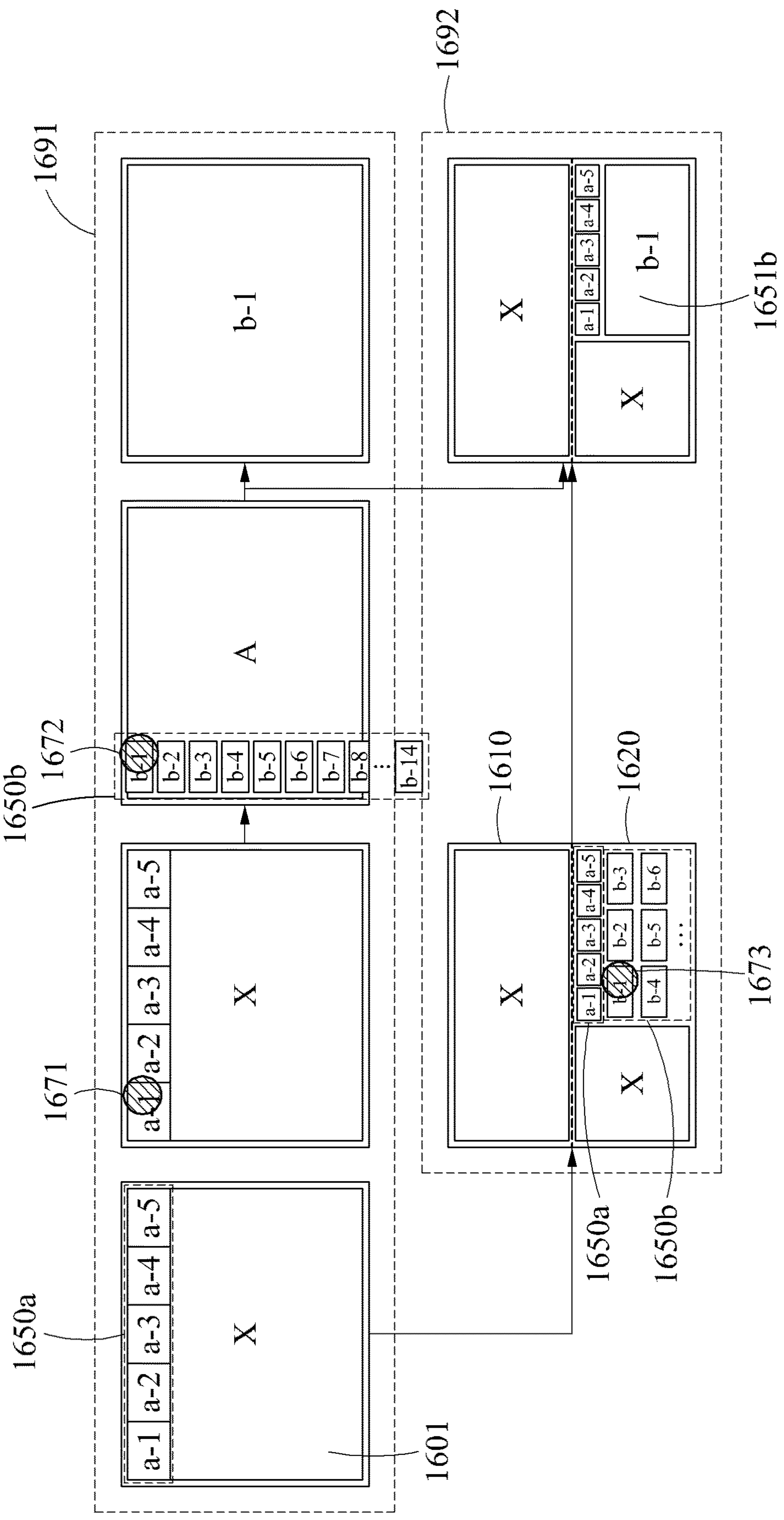

FIG. 15 is a flowchart illustrating an operation when some items of a plurality of menu items mapped to a flex mode 1692 are selected as a default menu. As illustrated in FIG. 16, a selection input 1671 for menu items 1650*a* of a first level may be required to access control elements 1650*b* of a second level in a full view mode 1691. In addition, the electronic device may provide a preview 1651*b* of a selected control element only when a selection input 1672 for the control elements 1650*b* of the second level in the full view mode 1691 is detected. Conversely, a control operation required to access a control element at a lower level and a preview corresponding to the control element may decrease in the flex mode 1692.

First, in operation 1531, the electronic device may select a default menu from among the menu items 1650*a* of the first level when entering to the flex mode 1692. According to an embodiment, the electronic device may select the default menu based on an arrangement order of the menu items 1650*a*. For example, in the example illustrated in FIG. 16, the electronic device may arrange the menu items 1650*a* of the first level in a direction (e.g., a left to right direction) in an entire area 1601 and output the menu items 1650*a*. The electronic device may determine, to be the default menu, an item a-1, that is, a first menu item (e.g., the leftmost item) of the menu items 1650*a* arranged in the direction. However, examples are not limited to the foregoing example, but a method of determining the default menu may vary depending on design and may be customized through an item preset by a user.

Then, in operation 1532, the electronic device may output, to a second area 1620, the control elements 1650*b* corresponding to an item of the second level included by the default menu. For example, the electronic device may output, to the second area 1620, the control elements 1650*b* of the second level included by a lower level of the item a-1 selected as the default menu. The electronic device may output the control elements 1650*b* of the second level included by the default menu together with the menu items 1650*a* of the first level. For reference, although the control elements 1650*b* of the second level is illustrated as being output in an icon view in FIG. 16, examples are not limited thereto.

In addition, depending on the number and size of control elements corresponding to an item included by the default menu, all the control items may not be simultaneously output to a limited area in a portion (e.g., an object arrangement space) of the second area 1620. The electronic device may output some of the control elements to the second area 1620 and limit an output of the other control elements. For example, in the example illustrated in FIG. 16, the electronic device may output, to the second area 1620, items b-1 to b-6 among items b-1 to b-14 included by the second level that is lower than the item a-1 of the first level and limit an output of the rest of items b-7 to b-14 of the second level. An operation when the object arrangement space is not sufficiently secured in the second area 1620 is described below with reference to FIGS. 22 to 25.

Subsequently, the electronic device may output a preview corresponding to a selected control element in response to detecting a selection input 1673 for one of the control elements 1650*b* of the second level. For example, the electronic device in the flex mode 1692 may output, to the second area 1620, the preview 1651*b* of the item b-1 selected while maintaining an output of a content element X in a first area 1610. Accordingly, the electronic device may compressively and intuitively provide various pieces of information in the flex mode 1692.

Figure 17:
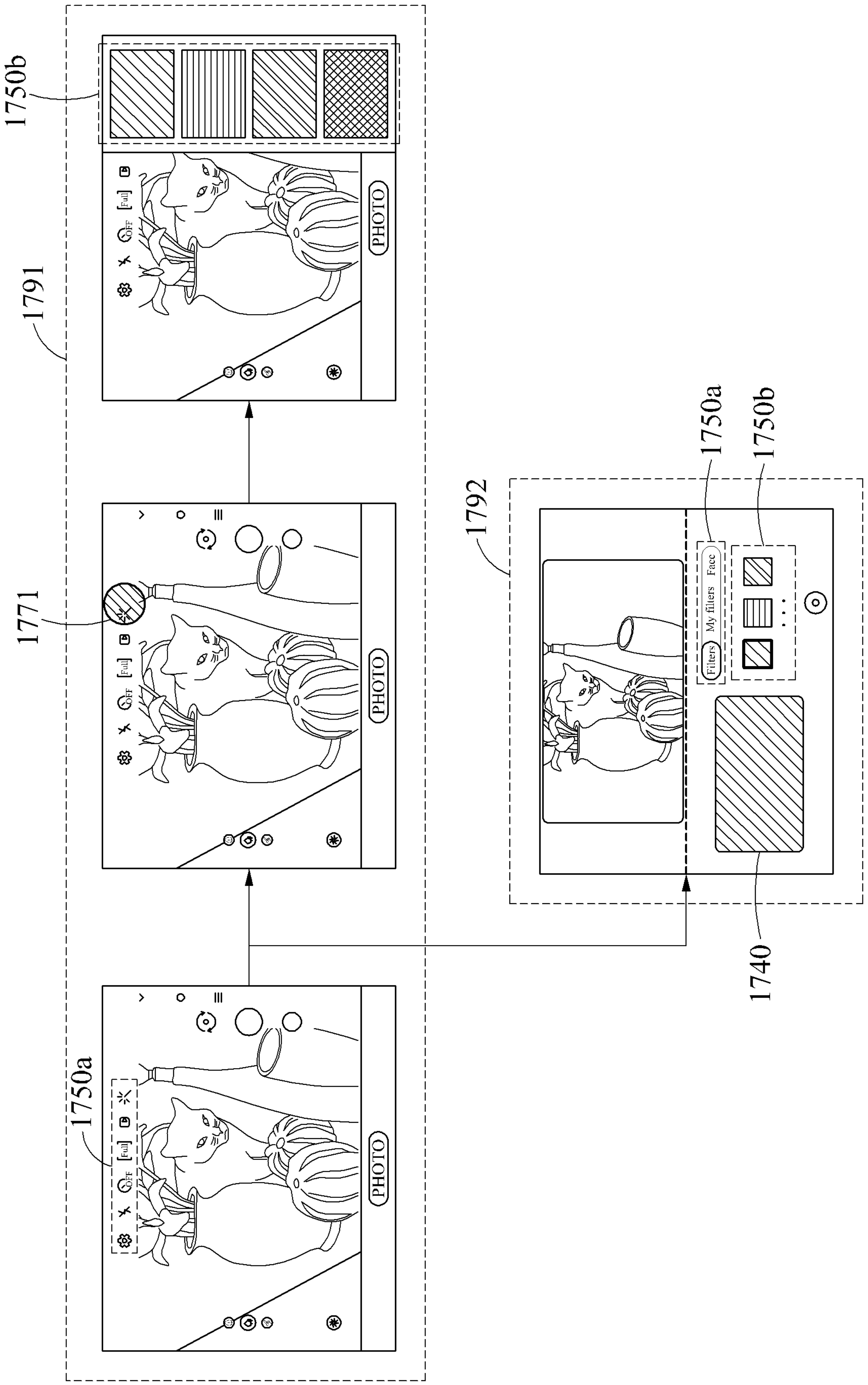

FIG. 17 illustrates an example of operating a camera application by the electronic device in the flex mode.

The electronic device may output a menu item 1750*a* of the first level related to a camera setting while executing the camera application in a full view mode 1791. The electronic device may output control elements 1750*b* of the second level in response to detecting a user input 1771 for the menu item 1750*a*. In the example illustrated in FIG. 17, the control elements 1750*b* of the second level may provide a camera filter interface.

When entering to a flex mode 1792, the electronic device may select, as a default menu, an item indicating a filter function from among a plurality of menu items. The electronic device may output, to a second area, the control elements 1750*b* of the second level that is lower than the level of the default menu. In addition, the electronic device may output, to a portion of the second area, a preview 1740 to which a filter is applied based on a control element selected by a user from among the control elements 1750*b* of the second level. For reference, the electronic device may further output the menu items 1750*a* of the first level to the second area.

Figure 18:
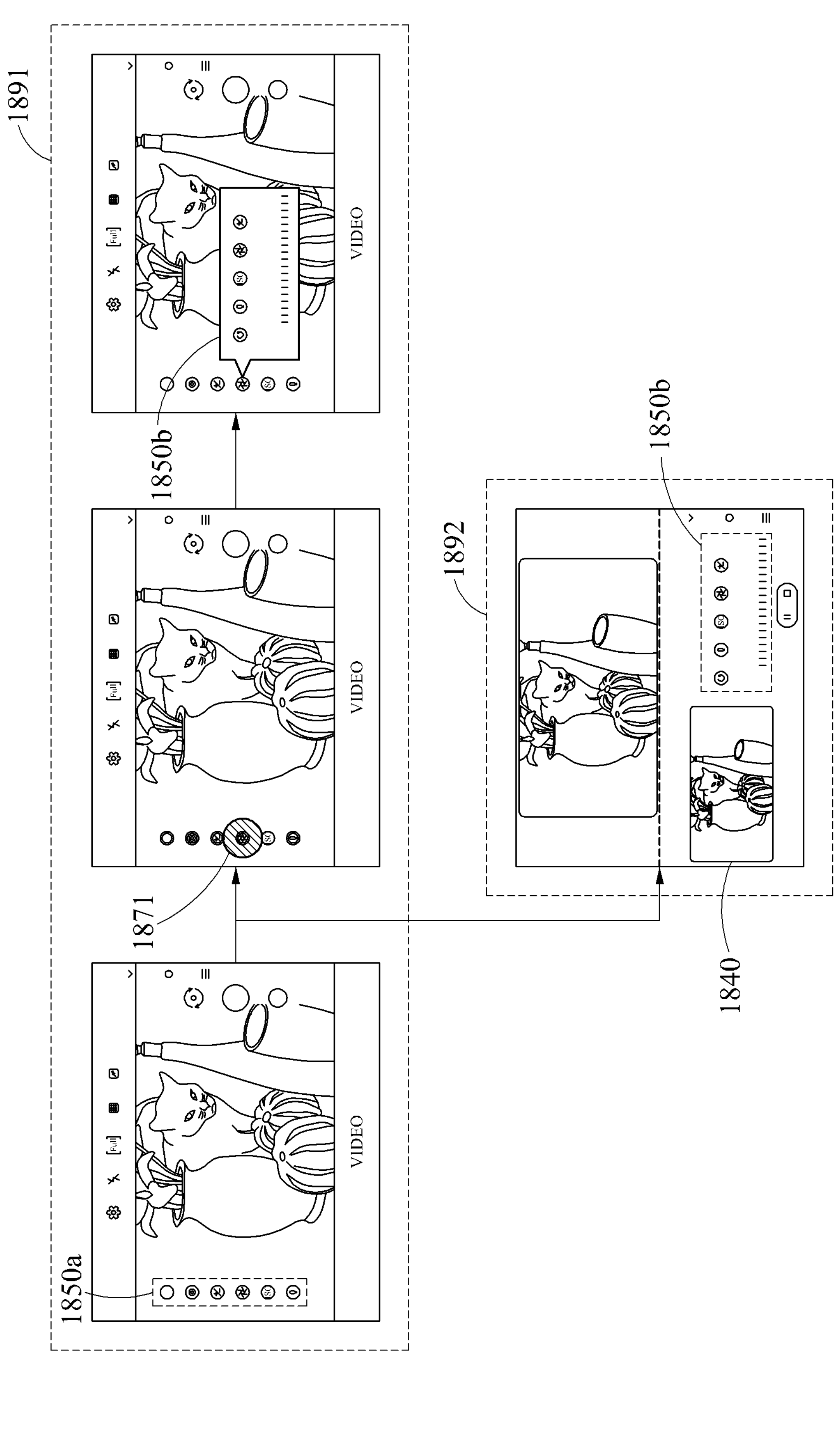

FIG. 18 illustrates another example of operating the camera application by the electronic device in the flex mode.

The electronic device may output menu items 1850*a* of the first level related to camera settings while executing the camera application in a full view mode 1891. The electronic device may output control elements 1850*b* of the second level providing an optical setting interface in response to detecting a selection input 1871 for the menu items 1850*a*. The optical setting interface may include, for example, an aperture exposure time, sensitivity, brightness, and white balance adjustment, and the like.

The electronic device may output an image content element representing a scene that is currently being captured through a camera to a first area in a flex mode 1892. The electronic device may output the control elements 1850*b* of the second level to the second area and further provide a portion of the second area with a preview 1840 according to a control element selected from among the control elements 1850*b*.

Figure 19:
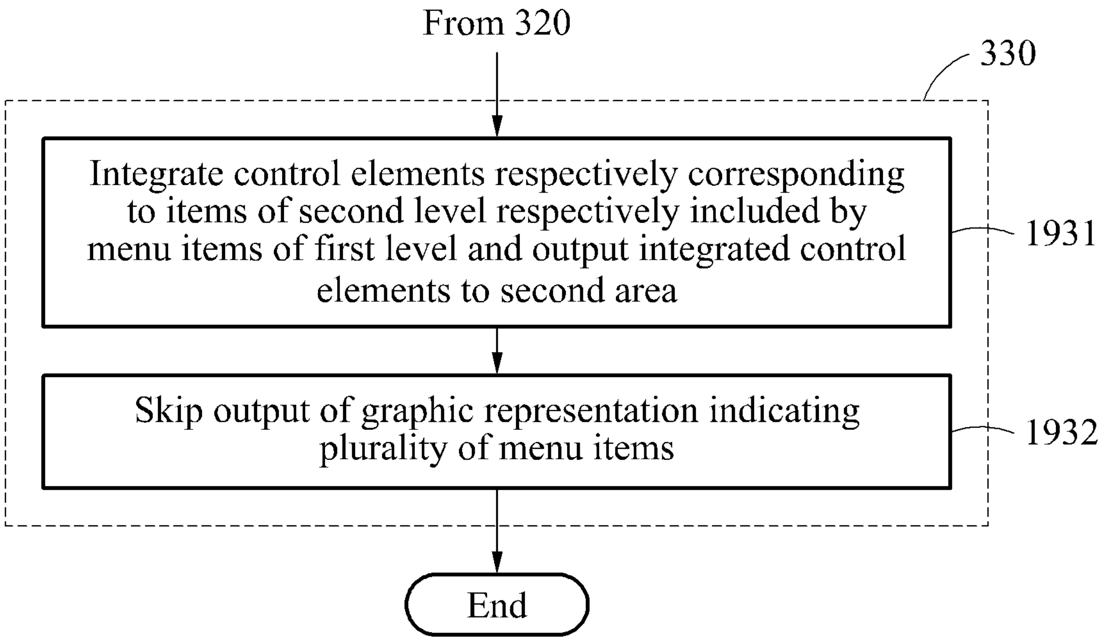
FIGS. 19, 20, and 21 are diagrams illustrating an integrated output of a control element in a flex mode, according to an example embodiment.
Figure 20:
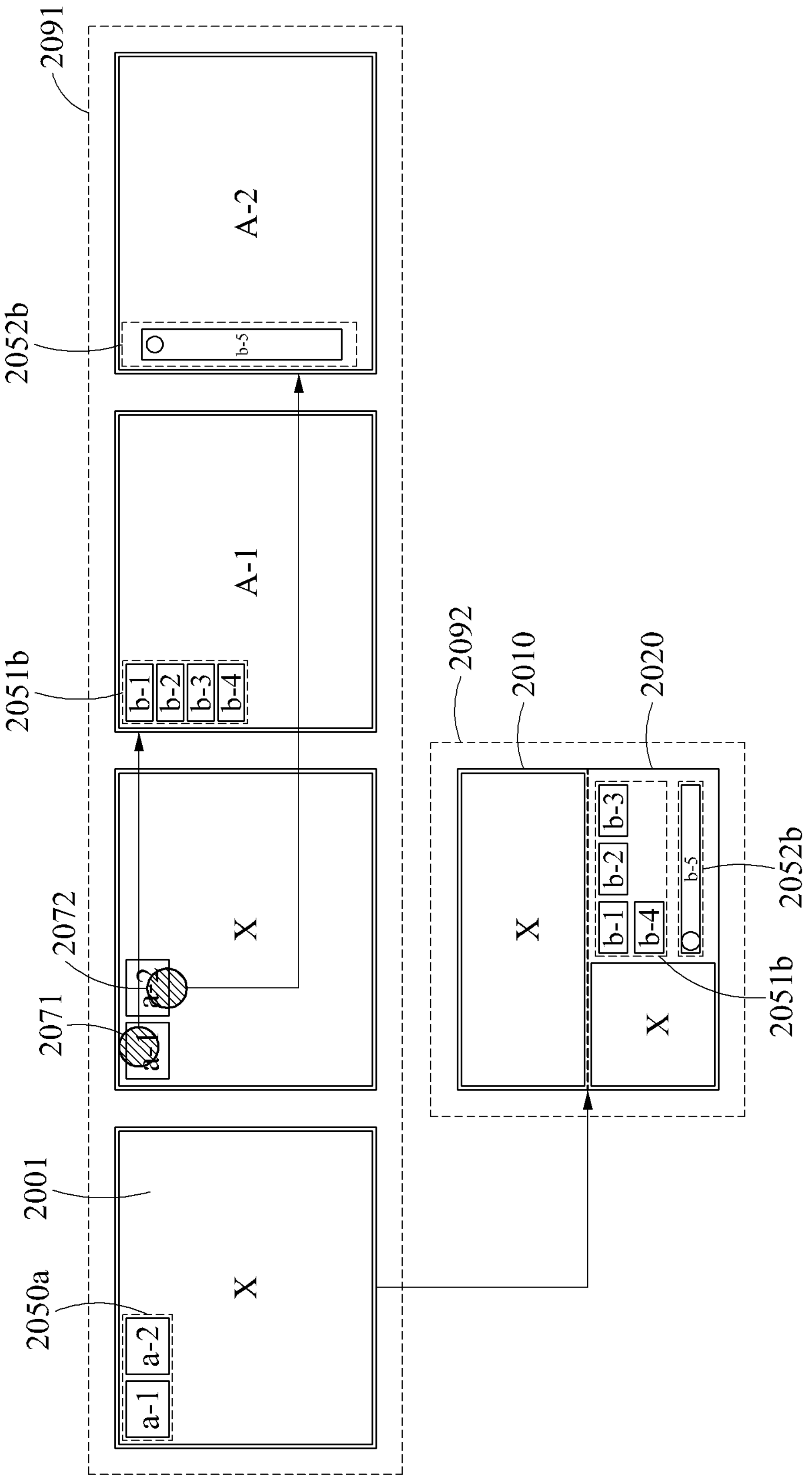
Figure 21:
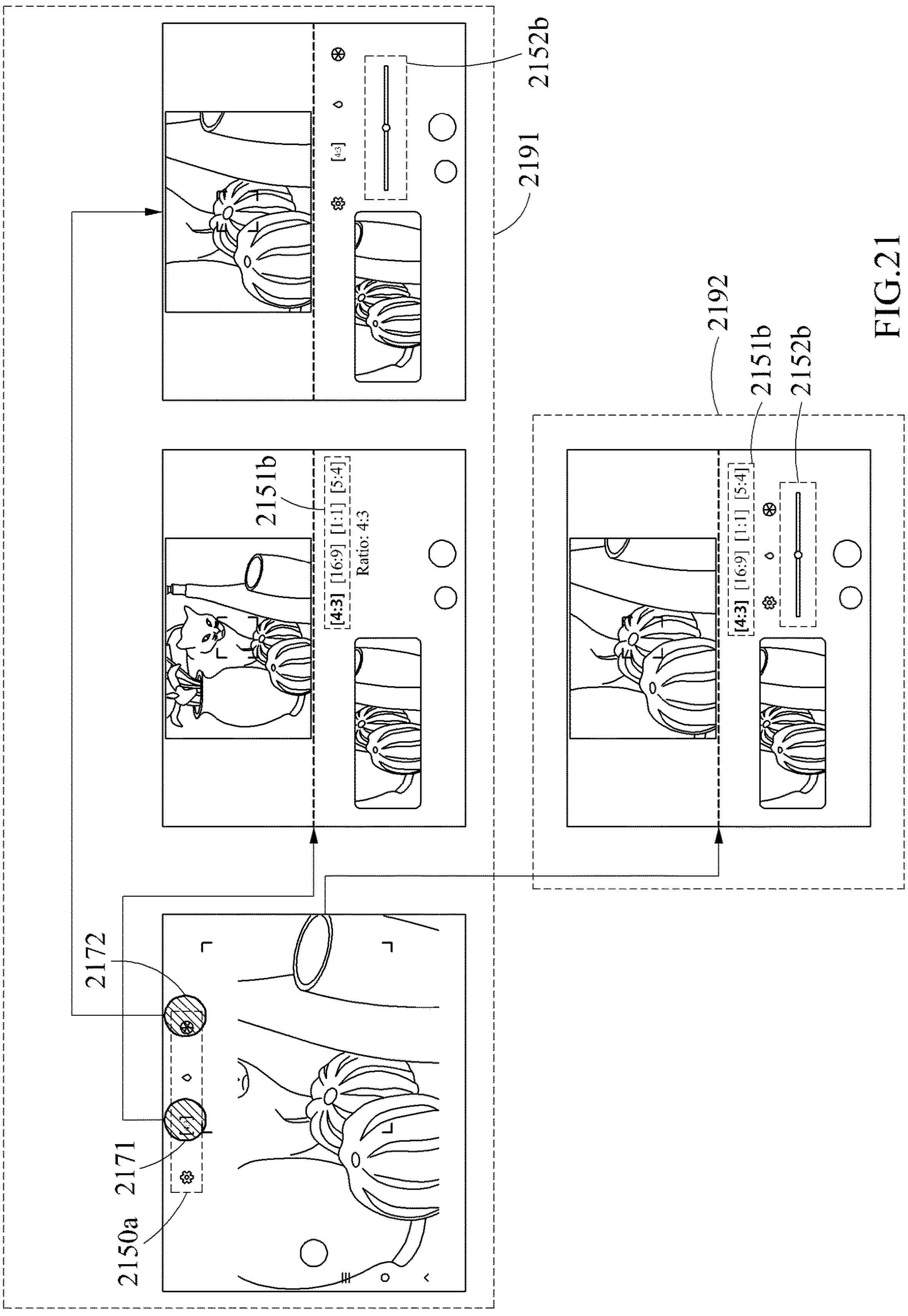

FIGS. 19 to 21 are diagrams illustrating an integrated output of a control element in a flex mode, according to an embodiment.

FIG. 19 is a flowchart illustrating a method of integrating items of a second level respectively included by menu items of a first level into one screen and outputting the integrated items. As illustrated in FIG. 20, menu items 2050*a* of the first level may include first control elements 2051*b* of the second level and second control elements 2052*b* of the second level in a full view mode 2091. For example, an item a-1 may include the first control elements 2051*b* and an item a-2 may include the second control elements 2052*b*. An electronic device may output the first control elements 2051*b* together with a content element A-1 in response to detecting a selection input 2071 for the item a-1. Similarly, the electronic device may output the second control elements 2052*b* together with a content element A-2 in response to detecting a selection input 2072 for the item a-2. The first control elements 2051*b* and the second control elements 2052*b* may not be simultaneously output in the full view mode 2091. Conversely, the electronic device may integrally output the first control elements 2051*b* and the second control elements 2052*b* in one screen in a flex mode 2092.

First, in operation 1931, the electronic device in the flex mode 2092 may output, to a second area 2020, control elements respectively corresponding to the items of the second level respectively included by the menu items of the first level all together. According to an embodiment, the electronic device may determine a target item to be output to the second area 2020 among the items of the second level respectively included by the menu items mapped to the flex mode 2092. For example, the electronic device may determine the items of the second level that are not functionally conflicting with one another to be the target item. A method and standard of determining the target item may vary depending on design.

The electronic device may integrally output a control element corresponding to the target item to the second area 2020. For example, referring to FIG. 20, the electronic device may simultaneously output the first control elements 2051*b* and the second control elements 2052*b* to the second area 2020. Although the first control elements 2051*b* are illustrated as being button objects and the second control elements 2052*b* are illustrated as being slider objects, examples are not limited thereto. Accordingly, although items of the same level that are included by items of different higher levels are not simultaneously output in the full view mode 2091, the electronic device may integrate the items and output the integrated items to the second area 2020 in the flex mode 2092. In this case, the electronic device may continuously output a content element X to a first area 2010.

Then, in operation 1932, the electronic device may skip an output of a graphic representation indicating a plurality of menu items. For example, the electronic device may limit exposure of the menu items 2050*a*. Since the first control elements 2051*b* and the second control elements 2052*b*, of which levels are respectively lower than the levels of the items a-1 and a-2, are already exposed, an output space for a control element may be sufficiently secured by skipping an output of the items a-1 and a-2 that are unnecessary. FIG. 21 illustrates integration of control elements of the camera application in the flex mode.

The electronic device may output menu items 2150*a* of the first level in a full view mode 2191. The electronic device may output first control elements 2151*b* for adjusting the proportion of a photo in response to a selection input 2171 for the menu items 2150*a*. The electronic device may output second control elements 2152*b* for adjusting a color tone in response to a selection input 2172. As described above, the electronic device may individually output control elements of a level lower than each menu item at different times in the full view mode 2191.

When entering to a flex mode 2192, the electronic device may output the first control elements 2151*b* of the second level and the second control elements 2152*b* of the second level all together. Accordingly, the electronic device may simplify a control operation required to access each function by integrating functions having been separately provided in one application and simultaneously outputting the integrated functions to one screen of the second area.

FIGS. 22 to 25 are diagrams illustrating an output method of a graphic representation, based on an area of control elements and an area of a second area in a flex mode, according to an embodiment.

Figure 22:
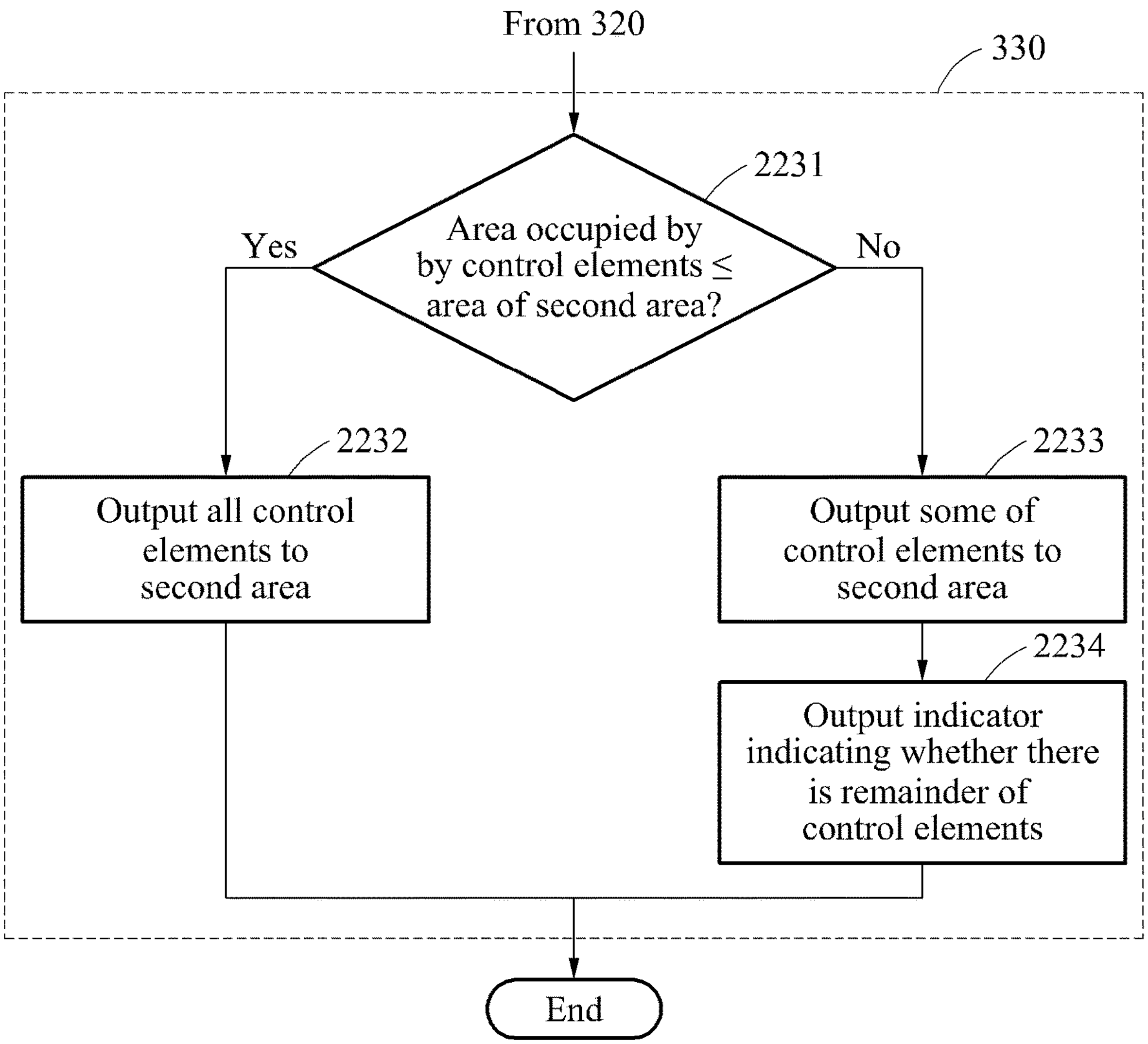
FIGS. 22, 23, 24, and 25 are diagrams illustrating an output method of a graphic representation, based on an area of control elements and an area of a second area in a flex mode, according to an example embodiment.

FIG. 22 illustrates the output method of the graphic representation, based on an area of an empty space of the second area.

First, in operation 2231, an electronic device may compare the area of the second area with an area that is occupied by a plurality of control elements needed to be output to the second area when entering to the flex mode. For example, the electronic device may calculate the area of the second area when entering to the flex mode. The second area may be a lower area with respect to a bending axis in a display, but a portion of the lower area may be determined to be the second area depending on an application. In addition, although the example of including one bending axis is mainly described herein, examples are not limited thereto, the electronic device may have a plurality of bending axes, and the ratio between a first area and the second area may vary depending on a bending part. The electronic device may determine control elements needed to be output to the second area at a current menu depth level when entering to the flex mode and calculate an area occupied by graphic representations indicating the control elements.

Then, in operation 2232, the electronic device may output all the control elements to the second area when the area occupied by the control elements is less than the area of the second area. In a list view, a maximum of three columns of control elements may be output to the second area.

In addition, in operation 2233, the electronic device may output some of the control elements to the second area when the area occupied by the control elements is greater than the area of the second area when entering to the flex mode. For example, the electronic device may divide the control elements into one or more object pages, based on the area of the second area. The electronic device may first output some control elements included by a first object page to the second area. The electronic device may limit an output of the remaining control elements included by another object page. For reference, the electronic device may individually output control elements when an area occupied by the control elements that are to be integrally output as illustrated in FIG. 20 is greater than the area of the second area.

Figure 23:
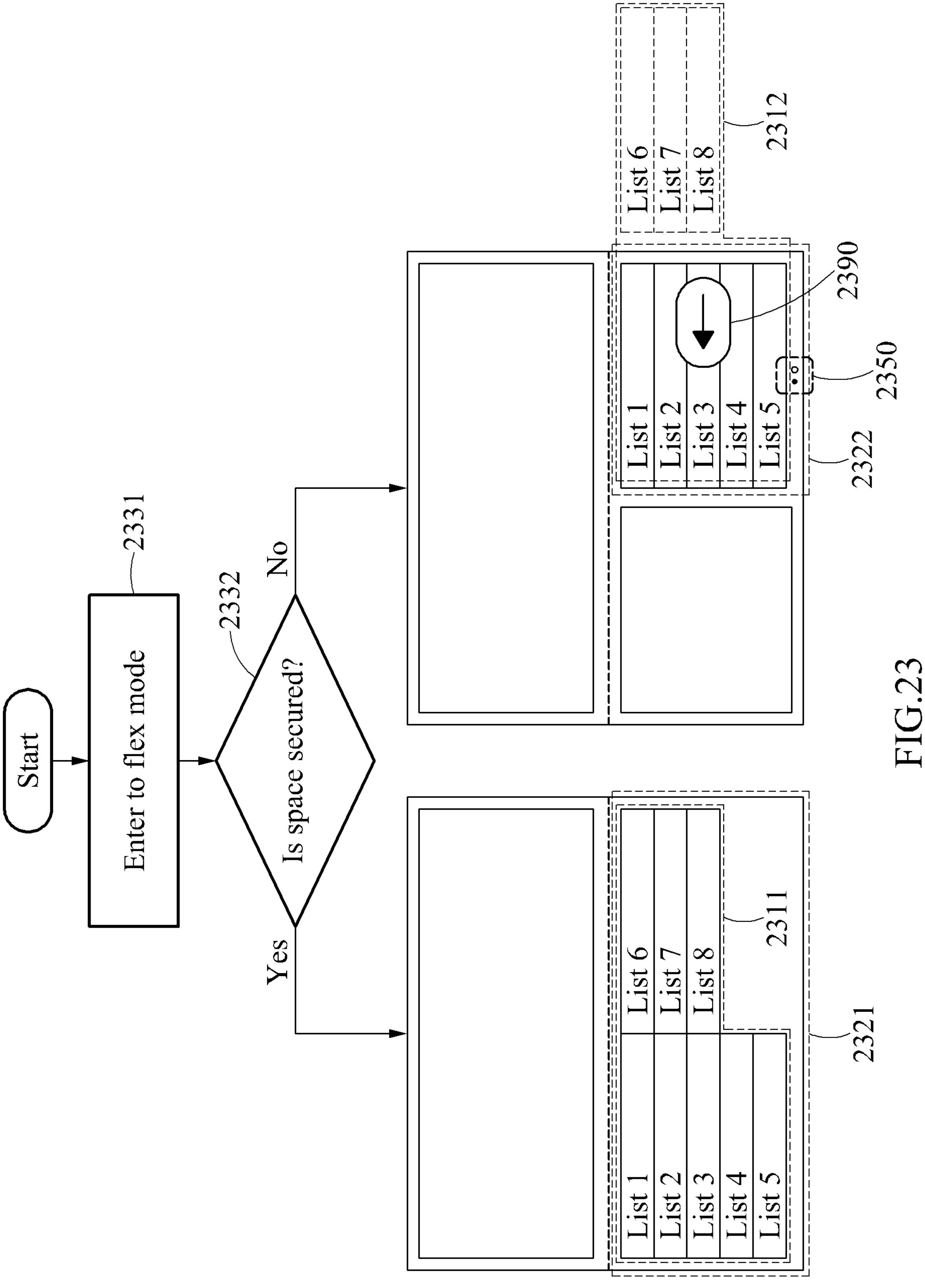

Subsequently, in operation 2234, the electronic device may output an indicator indicating whether there is the remainder of the control elements. For example, the electronic device may output an indicator indicating the other object page that is not exposed. The electronic device may output the control elements of the other object page in response to detecting a user input (e.g., a swipe input) calling the other object page. FIG. 23 illustrates an example of a list view. In operation 2331, the electronic device may enter to the flex mode. In operation 2332, the electronic device may determine whether a space of the second area is sufficiently secured. When the space of a second area 2321 is sufficiently secured, the electronic device may output all control elements 2311 in a list view to the second area 2321. Conversely, when the space of the second area 2322 is not sufficiently secured, the electronic device may output some (e.g., Lists 1 to 5) of the control elements 2312 in a list view to the second area 2322 and output an indicator 2350 indicating that there are the others (e.g., Lists 6 to 8). The electronic device may output, to the second area 2322, the rest of the control elements of which exposure is limited by replacing some control components in response to detecting a swipe input 2390.

Figure 24:
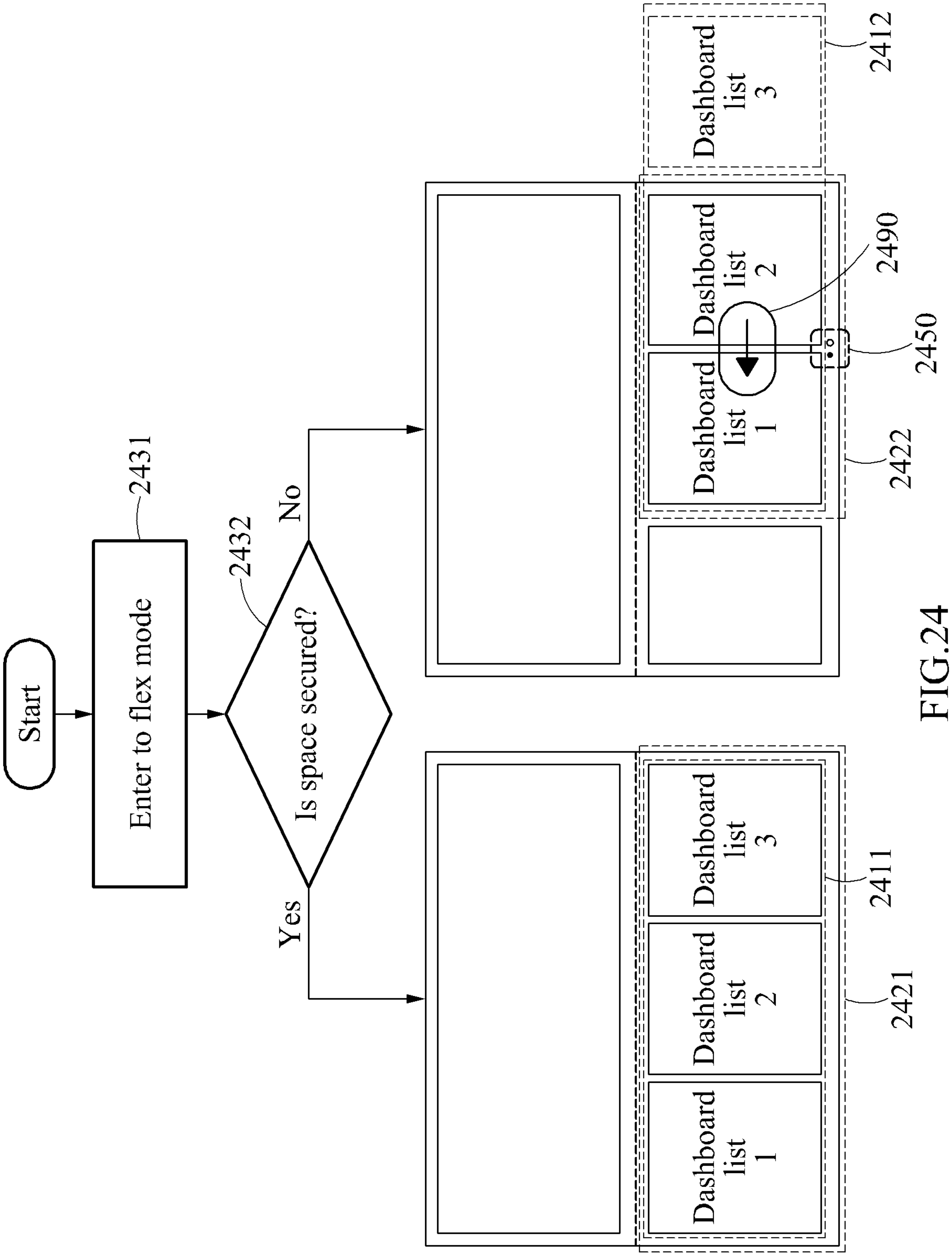

FIG. 24 illustrates an example of a dashboard view. In operation 2431, the electronic device may enter to the flex mode. In operation 2432, the electronic device may determine whether a space of the second area is sufficiently secured. When the space of a second area 2421 is sufficiently secured, the electronic device may output all control elements 2411 in a dashboard view to the second area 2421. Conversely, when the space of the second area 2422 is not sufficiently secured, the electronic device may output some (e.g., Dashboard lists 1 and 2) of the control elements 2412 in a dashboard view and output an indicator 2450 indicating that there is the remainder (e.g., Dashboard list 3). The electronic device may output the rest of the control elements to the second area 2422 in response to a swipe input 2490.

Figure 25:
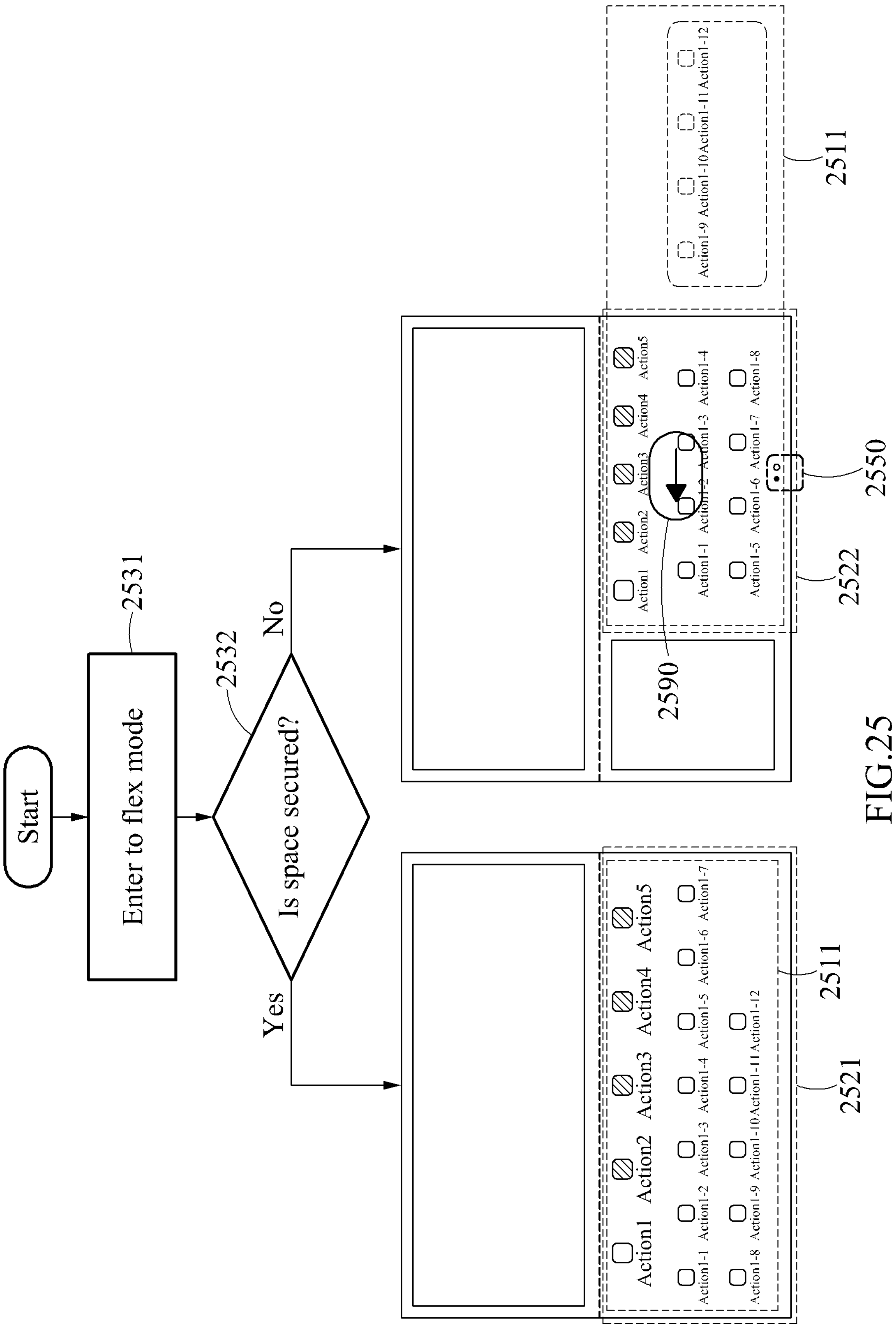

FIG. 25 illustrates an example of an icon view. In operation 2531, the electronic device may enter to the flex mode. In operation 2532, the electronic device may determine whether a space of the second area is sufficiently secured. When the space of a second area 2521 is sufficiently secured, the electronic device may output all control elements 2511 in an icon view to the second area 2521. Conversely, when the space of the second area 2522 is not sufficiently secured, the electronic device may output some (e.g., Actions 1-1 to 1-8) of the control elements 2511 in an icon view and output an indicator 2550 indicating that there are the others (e.g., Actions 1-9 to 1-12). The electronic device may output the rest of the control elements to the second area 2522 in response to a swipe input 2590.

FIGS. 26 to 29 are diagrams illustrating an editing interface for control elements in a flex mode, according to an embodiment.

According to an embodiment, an electronic device may enter to an edit mode when selection control with respect to one control element that is output to a second area is maintained exceeding a predetermined time length for the edit mode. Control to enter to the edit mode may be referred to as edit entry control. The electronic device may edit a plurality of control elements output to the second area, based on a user input, in the edit mode. For example, the electronic device in the edit mode may add a control element, change an arrangement order of control elements, delete a control element, and the like.

Figure 26:
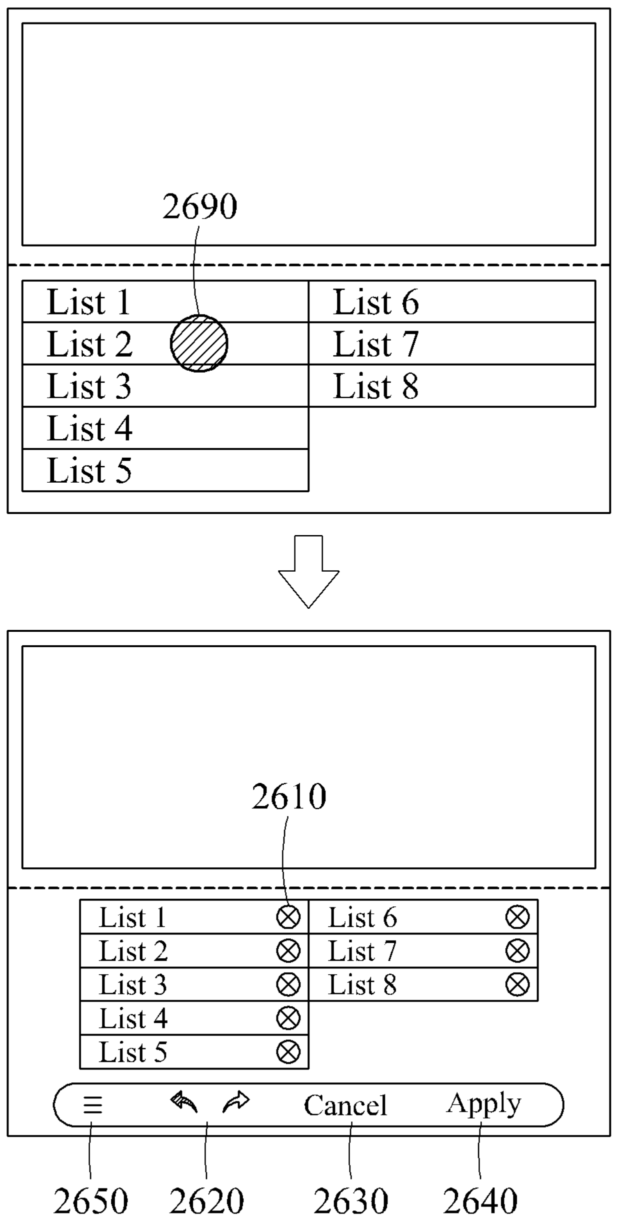
FIGS. 26, 27, 28, and 29 are diagrams illustrating an editing interface for control elements in a flex mode, according to an example embodiment.

FIG. 26 illustrates an edit mode with respect to control elements output in a list view. The electronic device may enter to the edit mode in response to detecting an edit entry control 2690 with respect to one control element among the control elements output in a list view. The electronic device may provide functions of deleting an existing list object in operation 2610, adding a new list object in operation 2650, restoring an editing state in operation 2620, canceling an edit in operation 2630, and applying an edit in operation 2640 in the edit mode.

Figure 27:
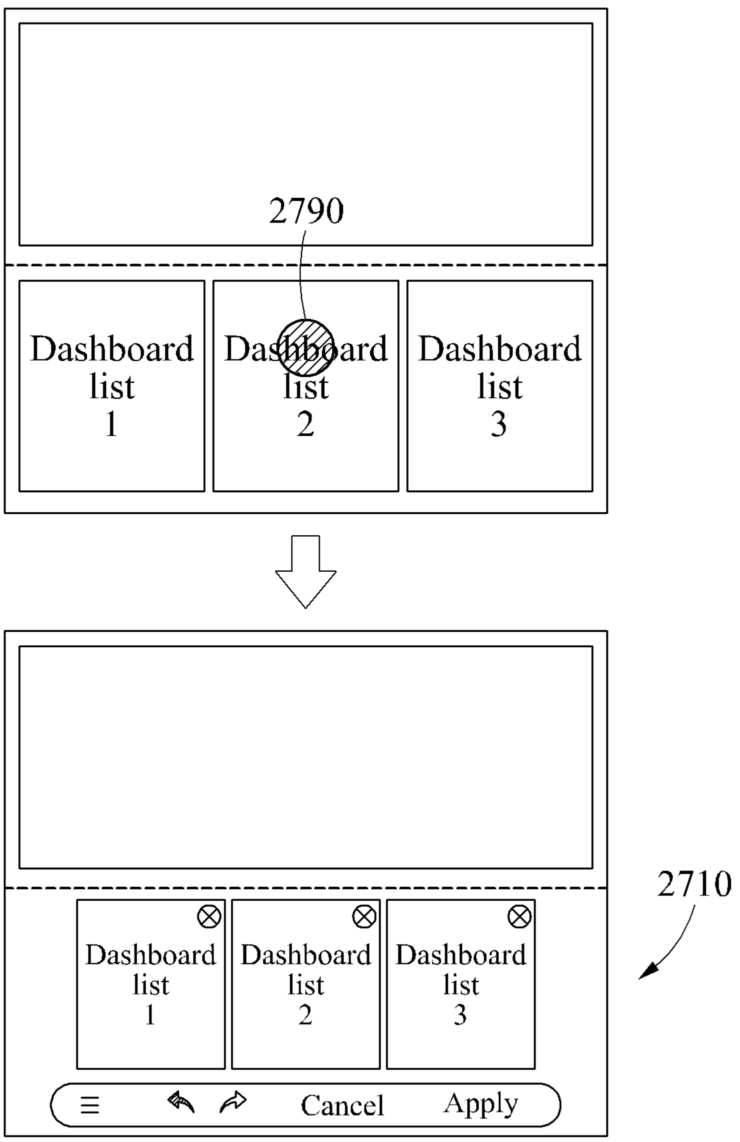

FIG. 27 illustrates an edit mode with respect to control elements output in a dashboard view. Similar to the description provided with reference to FIG. 26, the electronic device may enter to an edit mode 2710 in response to detecting an edit entry control 2790 with respect to one control element among the control elements output in a dashboard view.

Figure 28:
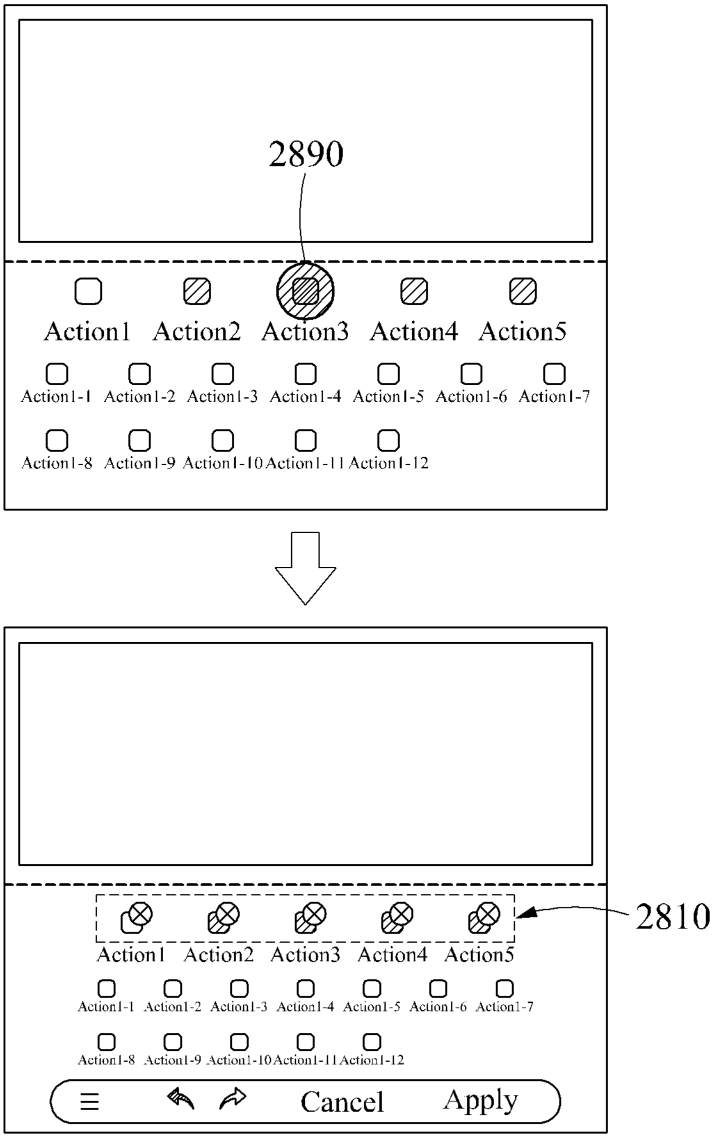

FIG. 28 illustrates an edit mode with respect to control elements output in an icon view, in which the electronic device may enter to the edit mode in response to detecting an edit entry control 2890. In this case, when control elements of a plurality of levels are simultaneously output to the second area, the electronic device may provide an edit function for control elements corresponding to one level. For example, as illustrated in FIG. 28, in response to detecting the edit entry control 2890 with respect to one control element among control elements of a first level, the electronic device may switch to a state such that only the control elements of the first level may be edited. The electronic device may limit an edit with respect to control elements (e.g., control elements, or Actions 1-1 to 1-12, of a second level in FIG. 28) of another level. However, the foregoing example is just an example, and the edit mode may vary depending on design.

Figure 29:
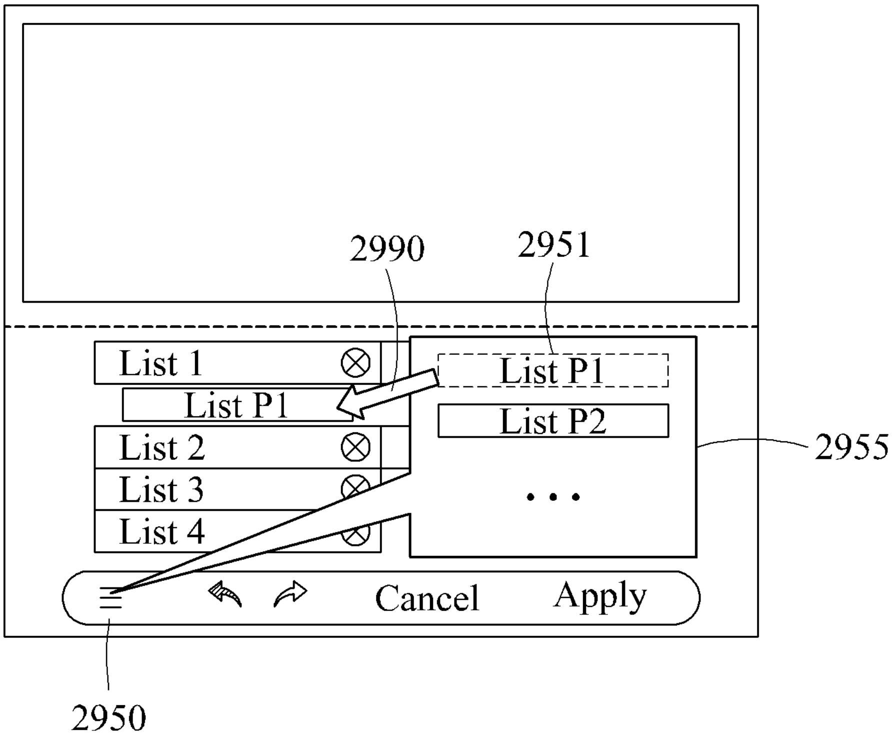

FIG. 29 illustrates an example scenario of an edit mode according to an embodiment.

For example, the electronic device may provide a candidate object list 2995 in response to a user input for operation 2950 of adding a new object. The candidate object list 2995 may include a list of candidate control elements to be added to the second area of the flex mode. For example, the electronic device may extract, as a candidate control element, a control element of a level corresponding to a menu depth level at a time when entering to an edit mode among control elements included by a hierarchical menu of an application. In addition, the electronic device may extract a candidate control element based on a control history (e.g., an execution frequency of control elements, etc.) of a user with respect to the control elements of the application. For example, the electronic device may store an execution frequency with respect to the control elements of the application before entering to the edit mode and arrange the candidate control elements in a descending order from a control element having the highest execution frequency among the control elements to a control element having the lowest execution frequency among the control elements. In this case, the electronic device may determine control elements of which execution frequencies are greater than or equal to a threshold frequency or top k control elements (here, k is an integer greater than or equal to 1) to be the candidate control elements. In addition, the electronic device may extract the candidate control elements from control elements that are not output in the flex mode.

The electronic device may receive a selection input for one candidate control element 2951 P1 of the candidate object list 2995. The electronic device may dispose the candidate control element 2951 P1 that is selected based on a user input 2990 in the second area. For example, the electronic device may detect, as the user input 2990, a touch input at a point corresponding to the candidate control element 2951 P1 that is selected and determine a position of the touch input to be a preliminary position of the candidate control element 2951 P1 while the touch input is maintained. When the preliminary position of the candidate control element 2951 P1 is in an area including existing objects, the electronic device may secure an output space for the candidate control element 2951 P1 by adjusting the position of the existing objects. When the touch input is released, the electronic device may designate an output position of the candidate control element 2951 P1 in the flex mode, based on a position where the touch input is released. For example, referring to FIG. 29, a position between a first object List 1 and a second object List 2 may be determined to be the output position of the candidate control element 2951 P1. However, examples are not limited to the foregoing example, a potential output position for the candidate control elements may be determined based on a predetermined arrangement, and the user input in the edit mode may only designate an arrangement order of the candidate control elements (e.g., an order of the first object List 1, the candidate control element 2951 P1, and the second object List 2, etc.).

For reference, although FIG. 29 illustrates the example scenario of the edit mode with respect to the control elements output in a list view illustrated in FIG. 26, examples are not limited thereto, and a similar description may apply to another view, such as a dashboard view or an icon view.

While the disclosure has been illustrated and described with reference to various embodiments, it will be understood that the various embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

The invention claimed is:

1. An electronic device comprising:

a display;

a bending detector configured to detect bending of the display;

at least one processor comprising processing circuitry electrically connected to the display and the bending detector; and memory comprising one or more storage medium storing instructions, that when executed by the at least one processor, individually and/or collectively, cause the electronic device to:

display menu items of a first level in a full view mode;

display a second level control element based on a selection input for a default menu among the menu items in the full view mode, the second level control element corresponding to at least one item of second level, the second level being lower than the first level;

divide the display into at least a first area and a second area and output a content element of an application to the first area when entering to a flex mode in response to detecting the bending of the display while the application is executed; and output, to the second area of the display, the second level control element corresponding to the at least one item of the second level comprised by the default menu that is mapped to the flex mode in the application when entering the flex mode, wherein the default menu comprises the at least one item of the second level, and the second level control element corresponding to the at least one item of the second level is hidden before the selection input for the default menu in the full view mode;

output, to the first area, a content element corresponding to the second level control element based on a user selection of the second level control element in the second area; and output, to the second area, a third level control element corresponding to a third level that is lower than the second level based on a user selection of the second level control element in the second area.

2. The electronic device of claim 1, wherein the instructions, that when executed by the at least one processor individually and/or collectively, further cause the electronic device to:

arrange the second level control element based on a predetermined arrangement in the second area.

3. The electronic device of claim 1, wherein the instructions, that when executed by the at least one processor individually and/or collectively, further cause the electronic device to: output, to the second area, first level control elements corresponding to a plurality of menu items of the first level together with a control element corresponding to an item of a level lower than the first level comprised by each of the menu items during the flex mode when the menu items are mapped to the flex mode.

4. The electronic device of claim 3, wherein the instructions, that when executed by the at least one processor individually and/or collectively, further cause the electronic device to:

during the flex mode, based on user selection of one of the menu items of the first level, output, to the second area, the control element corresponding to an item of a level lower than the first level comprised by the selected menu item and exclude an output related to the other menu items.

5. The electronic device of claim 1, wherein the instructions, that when executed by the at least one processor individually and/or collectively, further cause the electronic device to:

output the second level control element, wherein the second level control element is comprised by each of the menu items of the first level to the second area; and skip an output of a graphic representation indicating the menu items.

6. The electronic device of claim 1, wherein the instructions, that when executed by the at least one processor individually and/or collectively, further cause the electronic device to: compare an area of the second area with an area that is occupied by a plurality of control elements to be output to the second area when entering to the flex mode, when the area that is occupied by the plurality of the control elements is less than or equal to the area of the second area, output to the second area all of the plurality of the control elements, when the area that is occupied by the plurality of the control elements is greater than the area of the second area when entering to the flex mode, output to the second area some of the plurality of the control elements, and output an indicator indicating whether there is a remainder of the plurality of the control elements.

7. The electronic device of claim 1, wherein the instructions, that when executed by the at least one processor individually and/or collectively, further cause the electronic device to:

depending on a menu depth level when entering to the flex mode in a hierarchical menu structure of the application, output a content element corresponding to the menu depth level to the first area and output a control element corresponding to the menu depth level to the second area.

8. A method performed by an electronic device, the method comprising:

displaying menu items of a first level in a full view mode of the electronic device;

displaying a second level control element based on a selection input for a default menu among the menu items in the full view mode, the second level control element corresponding to at least one item of second level, the second level being lower than the first level;

dividing a display into at least a first area and a second area and outputting a content element of an application to the first area when entering to a flex mode in response to detecting bending of the display while an application is executed;

outputting, to the second area of the display, the second level control element corresponding to the at least one item of the second level comprised by the default menu that is mapped to the flex mode in the application when entering the flex mode, wherein the default menu comprises the at least one item of the second level, and the second level control element corresponding to the at least one item of the second level is hidden before the selection input for the default menu in the full view mode;

outputting, to the first area, a content element corresponding to the second level control element based on a user selection of the second level control element in the second area; and outputting, to the second area, a third level control element corresponding to a third level that is lower than the second level based on a user selection of the second level control element in the second area.

9. The method of claim 8, wherein the outputting the second level control element to the second area further comprises:

outputting, to the second area, control elements corresponding to a plurality of menu items of the first level together with a control element corresponding to an item of a level lower than the first level comprised by each of the menu items during the flex mode when the menu items are mapped to the flex mode;

during the flex mode, when the user selects one of the menu items of the first level, outputting, to the second area, a control element corresponding to an item of a level lower than the first level comprised by the selected menu item; and excluding an output related to the other menu items.

10. The method of claim 8, wherein the outputting the second level control element to the second area further comprises:

further outputting the second level control element, wherein the second level control element is comprised by each of the menu items of the first level to the second area; and skipping an output of a graphic representation indicating the menu items.

11. The method of claim 8, wherein the outputting the second level control element to the second area further comprises:

comparing an area of the second area with an area that is occupied by a plurality of control elements to be output to the second area when entering to the flex mode;

when the area that is occupied by the plurality of the control elements is less than or equal to the area of the second area, outputting to the second area all of the plurality of the control elements;

when the area that is occupied by the plurality of the control elements is greater than the area of the second area when entering to the flex mode, outputting to the second area some of the plurality of the control elements; and outputting an indicator indicating whether there is a remainder of the plurality of the control elements.

12. A non-transitory computer readable storage medium storing instructions, wherein the instructions, when executed by at least one processor individually and/or collectively, cause an electronic device to:

display menu items of a first level in a full view mode;

display a second level control element based on a selection input for a default menu among the menu items in the full view mode, the second level control element corresponding to at least one item of second level, the second level being lower than the first level;

divide the display into at least a first area and a second area and output a content element of and application to the first area when entering to a flex mode in response to detecting bending of the display while the application is executed; and output, to the second area of the display, the second level control element corresponding to the at least one item of the second level comprised by the default menu that is mapped to the flex mode in the application when entering the flex mode, wherein the default menu comprises the at least one item of the second level, and the second level control element corresponding to the at least one item of the second level is hidden before the selection input for the default menu in the full view mode;

output, to the first area, a content element corresponding to the second level control element based on a user selection of the second level control element in the second area; and output, to the second area, a third level control element corresponding to a third level that is lower than the second level based on a user selection of the second level control element in the second area.

13. The non-transitory computer readable storage medium of claim 12, wherein instructions, that when executed by the at least one processor individually and/or collectively, further cause the electronic device to:

arrange the second level control element based on a predetermined arrangement in the second area.

14. The non-transitory computer readable storage medium of claim 12, wherein instructions, that when executed by the at least one processor individually and/or collectively, further cause the electronic device to:

output, to the second area, first level control elements corresponding to a plurality of menu items of the first level together with a control element corresponding to an item of a level lower than the first level comprised by each of the menu items during the flex mode when the menu items are mapped to the flex mode.

15. The non-transitory computer readable storage medium of claim 14, wherein instructions, that when executed by the at least one processor individually and/or collectively, further cause the electronic device to:

during the flex mode, based on user selection of one of the menu items of the first level, output, to the second area, the control element corresponding to an item of a level lower than the first level comprised by the selected menu item and exclude an output related to the other menu items.

* * * * *